US008650067B1

(12) United States Patent
Moss

(10) Patent No.: US 8,650,067 B1
(45) Date of Patent: Feb. 11, 2014

(54) SYSTEMS, METHODS, AND COMPUTER PROGRAM PRODUCT FOR REAL ESTATE VALUE ANALYSIS

(76) Inventor: Richard Moss, Chapel Hill, NC (US)

(*) Notice: Subject to any disclaimer, the term of this patent is extended or adjusted under 35 U.S.C. 154(b) by 1444 days.

(21) Appl. No.: 12/037,168

(22) Filed: Feb. 26, 2008

Related U.S. Application Data

(60) Provisional application No. 60/903,646, filed on Feb. 27, 2007.

(51) Int. Cl.
*G06Q 10/00* (2012.01)

(52) U.S. Cl.
USPC ....... 705/7.35; 705/7.28; 705/7.29; 705/7.31; 705/306; 705/313

(58) Field of Classification Search
USPC .............. 705/7.35, 7.28, 7.29, 7.31, 306, 313
See application file for complete search history.

(56) References Cited

U.S. PATENT DOCUMENTS

| | | | | |
|---|---|---|---|---|
| 5,361,201 A | * | 11/1994 | Jost et al. | 705/35 |
| 5,414,621 A | * | 5/1995 | Hough | 705/7.34 |
| 5,754,850 A | * | 5/1998 | Janssen | 707/758 |
| 5,857,174 A | * | 1/1999 | Dugan | 705/313 |
| 6,609,118 B1 | * | 8/2003 | Khedkar et al. | 705/36 R |
| 6,876,955 B1 | * | 4/2005 | Fleming et al. | 702/194 |
| 7,236,985 B2 | * | 6/2007 | Brecher | 707/792 |
| 7,305,328 B1 | * | 12/2007 | Fleming et al. | 702/194 |
| 7,711,574 B1 | * | 5/2010 | Bradley et al. | 705/306 |
| 7,788,186 B1 | * | 8/2010 | An et al. | 705/306 |
| 7,983,925 B1 | * | 7/2011 | Kuo | 705/1.1 |
| 2001/0039506 A1 | * | 11/2001 | Robbins | 705/10 |
| 2002/0007336 A1 | * | 1/2002 | Robbins | 705/37 |
| 2002/0087389 A1 | * | 7/2002 | Sklarz et al. | 705/10 |
| 2003/0229552 A1 | * | 12/2003 | Lebaric et al. | 705/35 |
| 2005/0192930 A1 | * | 9/2005 | Hightower et al. | 707/1 |
| 2005/0288957 A1 | * | 12/2005 | Eraker et al. | 705/1 |
| 2006/0004653 A1 | * | 1/2006 | Strongin | 705/39 |
| 2006/0059066 A1 | * | 3/2006 | Glinberg et al. | 705/35 |
| 2006/0117303 A1 | * | 6/2006 | Gizinski | 717/136 |
| 2009/0043637 A1 | * | 2/2009 | Eder | 705/10 |

OTHER PUBLICATIONS

Galaty, Fillmore-Allaway, Wellington-Kyle, Robert, 2003, Modern Real Estate Practice, Dearborn Real Estate Education.*
Svetnik, Vladimir_Liaw, Andy_Tong, Christopher_Culberson, Christopher_Sheridan, Robert_Feuston, Bradley_2003, Random Forest: A Classification an Regression Tool for Compound Classification and QSAR Modeling, J. Chem Inf. Computer Science, vol. 23, pp. 1947-1958.*

(Continued)

*Primary Examiner* — Jonathan G Sterrett
*Assistant Examiner* — Stephen S Swartz
(74) *Attorney, Agent, or Firm* — Law Offices of Peter H. Priest, PLLC

(57) ABSTRACT

Methods, apparatus, and computer-readable media are described for generating a credible market value that is utilized to produce a listing price for a property with reduced risk of a substantial reduction in the listing price before selling the property and for assessing risk of incorrectly pricing a property. A subject property, selected comparables, and selected comparables having multiple sales are imported from one or more databases for analysis. Information that is imported may include, for example, property features, original listing prices, record of days on the market, and a final listing price and sales price for each property that was sold. A market analysis process is run to produce relative market assessments and a residential value process is run including appreciation calculations based on the comparable properties having multiple sales to produce the credible market value. Graphs are plotted and other computer outputs are provided to identify the risk of incorrectly pricing a property and to illustrate that risk to a potential seller. Additionally, tools are provided to readily illustrate how changes in underlying assumptions affect the analysis.

21 Claims, 24 Drawing Sheets

(56) References Cited

OTHER PUBLICATIONS

Case, Karl and Shiller, Robert, 1987, Prices of Singe Family Homes since 1970: New Indexes for Four Cities, NBER Working Paper Series, Working Pater No. 2393, pp. 1-51.*

Anglin, Paul_Rutherford, Ronald_Springer, Thomas, 2003, The Trade-off between the selling price of residential properties and time on the market; the impact of price setting, Journal of Real Estate Finance and Economics, 26:1, 95-111, pp. 95-111.*

Knight, John R., "Listing price, time on market, and ultimate selling price: causes and effects of listing price changes", (Jun. 22, 2002), Real Estate Economics.

\* cited by examiner

Fig. 10

Appreciation Calculations

Properties Not Used in Calculations — 1308

Add Properties with Multiple Closed Dates — 1304

| | Num | St | Sold Price | Closed Date |
|---|---|---|---|---|
| Edit | 1 | Ashwood Square | $114,000.00 | 3/25/2002 |
| Edit | 4 | Aurora Ct | $255,000.00 | 9/16/2004 |
| Edit | 2 | Autumn Woods | $181,500.00 | 8/21/2003 |
| Edit | 1 | Autumn Woods Dr | $177,000.00 | 5/4/2004 |
| Edit | 25 | Autumn Woods Dr | $213,900.00 | 7/23/2004 |
| Edit | 27 | Autumn Woods Dr | $238,400.00 | 1/9/2006 |
| Edit | 35 | Autumn Woods Dr | $253,000.00 | 12/14/2005 |
| Edit | 37 | Autumn Woods Dr | $186,500.00 | 6/5/2006 |
| Edit | 19 | Barkridge | $219,900.00 | 5/22/2003 |
| Edit | 4 | Barkridge | $223,000.00 | 7/15/2002 |

Calculated Totals — 1318
- Average 3.6%
- Median 4.0%

1314
- Number of homes sold 434
- Number of homes sold more than once 70
- Number of homes used in calculation 70

Remove All Matches — 1310    Remove Checked Properties — 1312

Properties Used in Calculation — 1306                                   1316

| | Num | St | Closed | Sales Price | Years | App/Year |
|---|---|---|---|---|---|---|
| ☐ | 4 | Autumn Woods | 5/14/2002 | $182,500 | 3 | 2.8 |
| ☐ | 4 | Autumn Woods | 4/29/2005 | $197,500 | | |
| ☐ | 15 | Birchcrest Ct | 3/28/2002 | $195,000 | 5.3 | 3.6 |
| ☐ | 15 | Birchcrest Ct | 7/20/2007 | $232,000 | | |
| ☐ | 201 | Brandermill Dr | 8/28/2002 | $178,000 | 5 | 1.3 |
| ☐ | 201 | Brandermill Dr | 8/24/2007 | $189,900 | | |
| ☐ | 314 | Brandermill Dr | 3/26/2004 | $165,400 | 2.2 | 4 |
| ☐ | 314 | Brandermill Dr | 6/15/2006 | $180,000 | | |

Risk Assessment

Optional DOM until Price Change: 37

Actual DOM to price change: 10   Delete Checked Properties

| StreetNum | StreetName | ChangeDate | DOM | Sqft Tot | OrigList LP | LP | SP | SP/OLP |
|---|---|---|---|---|---|---|---|---|
| 55 | Summit Ridge | 8/7/2007 | 0 | 2609 | $268,500.00 | $268,500.00 | $260,000.00 | 100% |
| 15 | Birchcrest Court | 7/20/2007 | 0 | 1935 | $230,900.00 | $230,900.00 | $232,000.00 | 100% |
| 702 | Sleepy Creek Drive | 6/12/2006 | 0 | 1057 | $139,900.00 | $139,900.00 | $136,000.00 | 100% |
| 31 | Langate | 8/1/2007 | 1 | 1750 | $205,000.00 | $205,000.00 | $205,000.00 | 100% |
| 8 | Hurdle | 1/12/2007 | 44 | 2600 | $269,900.00 | $269,900.00 | $255,000.00 | 100% |
| 7 | Chestnut Bluffs Lane | 5/21/2007 | 47 | 1493 | $209,000.00 | $209,000.00 | $205,000.00 | 100% |
| 5 | Trawick Court | 7/6/2007 | 47 | 1800 | $175,000.00 | $162,00.00 | $158,000.00 | 92.6% |
| 25 | Summit Ridge Ct. | 10/30/2007 | 49 | 2300 | $279,900.00 | $269,900.00 | $265,000.00 | 96.4% |
| 122 | Legacy | 5/26/2007 | 49 | 1838 | $217,000.00 | $214,000.00 | $211,000.00 | 98.6% |
| 5 | Leeward | 10/30/2006 | 51 | 1400 | $182,900.00 | $179,900.00 | $178,000.00 | 98.4% |
| 527 | Woodwings Dr | 1/27/2007 | 52 | 1203 | $135,000.00 | $135,000.00 | $135,000.00 | 100% |

Fig. 15A

New Subject Values Based on:

| | | | |
|---|---|---|---|
| Appreciation | $183,810 | Weighted Comps | $207,000 |
| Replacement | $208,312 | Median Comps | $209,000 |
| Price per SqFt | $214,189 | Weighted Avg All Factors | $204,885 |
| | | Trial Price | $200,000 |

Appreciation used: ProForma, 3.0%

| Range | Comps | Appreciation | Replacement | Adj SqFt | All Factors |
|---|---|---|---|---|---|
| Low | $201.7 | 3.3% | 76.4% | $112.1 | $184.0 |
| High | $211.5 | 5.1% | 81.0% | $129.9 | $214.0 |
| Average | $207.0 | 4.3% | 78.1% | $122.5 | $205.0 |
| Subject | $200.0 | 4.0% | 75.0% | $114.4 | $200.0 |

| Comp Level | Original Price | Total Adjustments | % Total Adjustments | Net Adjustments | % Net Adjustments | Total Adjusted Value | Weight |
|---|---|---|---|---|---|---|---|
| 1 | $196.9 | $17.3 | 8.8% | $9.4 | 4.8% | $206.3 | 20.0% |
| 2 | $209.9 | $20.4 | 9.7% | $1.6 | 0.8% | $211.5 | 20.0% |
| 3 | $187.0 | $21.9 | 11.7% | $14.7 | 7.9% | $201.7 | 20.0% |
| 4 | $214.9 | $26.9 | 12.5% | -$6.0 | -2.8% | $208.9 | 20.0% |
| 5 | $197.0 | $12.6 | 6.4% | $11.7 | 5.9% | $208.7 | 20.0% |

☐ Include Special Feature in Replacement Value
☐ Include Splittable Lots in Sq Ft Calculation
[ Update ]

General Assumptions
[ North Raleigh ▾ ]
[ Apply as General Assumption ]

Feature Values
[ * Standard ▾ ]
[ Apply as Feature Values ]

[ View Charts ]
[ Create Report ]

Fig. 16

SYSTEMS, METHODS, AND COMPUTER PROGRAM PRODUCT FOR REAL ESTATE VALUE ANALYSIS

CROSS REFERENCE TO RELATED APPLICATION

The present application claims the benefit of U.S. Provisional Patent Application No. 60/903,646 entitled "REAL ESTATE VALUE ANALYSIS METHODS AND SYSTEMS" and filed on Feb. 27, 2007 which is hereby incorporated by reference in its entirety.

FIELD OF THE INVENTION

The present invention relates generally to real estate value analysis systems, methods, and computer program products, and more particularly to advantageous techniques and models for residential pricing analysis, pricing sensitivity analysis, risk assessment, and appreciation analysis.

BACKGROUND OF INVENTION

One or more real estate professionals, realtors, may be invited by a home or property owner to evaluate the "value" of their home and quote a likely selling price. In today's environment, the realtor will visit the home and take note of its features and then manually review a multiple listing service (MLS) for comparable homes that have recently sold in the area. This comparative market analysis (CMA) may consider the prices of comparable recently sold homes, on-the-market homes, and homes that were on the market, but weren't sold. Based on personal skills in evaluating a home's value, the realtor will quote the seller a price for selling the home. Many times this quote is a simple number on a piece of paper without any backup material to support the analysis used to generate the selling price. The realtor may also consider the on-the-market homes as competition to selling the owner's home and may adjust the selling price based on the analysis up or down depending upon market conditions. A more sophisticated approach utilizes a manually prepared booklet that may include a limited number of recently sold "comparables" to support a price analysis.

Knowledgeable home owners may also do their own analysis by visiting open houses in their area to compare features, location, and the asking prices. Such home owner evaluations are usually limited in scope and based on personal preferences not on independent assessments and knowledge of the existing market conditions. Even so, a realtor may encounter home owners who prefer to set the price of their home based on their own limited evaluation.

Another method of evaluating a value for a home may include using an average price per square foot for homes that have sold in the owner's neighborhood. This method is fraught with its own set of problems. For example, knowing an average value may be worthless if the range of values used is not known.

There are many other situations that may affect the selling price for a home. For example, the age of the home, whether homes in the area are selling quickly or taking a long time on the market, are interest rates high or low, is the job market good or bad, is the economy such that it is a buyers market, and the like. In addition, competition in the real estate business is increasing, consumers are becoming more involved, and more real estate information is available through Internet services.

The pricing of a home or property is of critical importance since it is a primary concern of all parties, should reflect all factors that affect a valuation of the home or property, and has a direct effect on the length of time the home or property remains on the market. Even though the importance of pricing is recognized, determining a price is hard and may be ambiguous. For example, pricing by a realtor generally requires investigation, judgment of multiple factors, analysis including the use of mathematics, presentation of a price and pricing analysis, and negotiation skills. Also, pricing may be controversial due to conflicting interests, be based on misinformation from inaccurate sources, such as from unreliable Internet sources, friends, and associates, and requires prediction of various market forces that affect pricing. Further, the method of evaluating the value of a home or property and the method of generating a selling price is generally inconsistent among real estate agents, even those from the same real estate firm. Due to these and similar subjective pricing methods, real estate agents, buyers, and sellers are often not confident in the pricing information. As a result, buyers, sellers, and realtors are not happy with a price and may set a price independent of the pricing analysis they are not confident in. By having inaccurate pricing, many homes are priced too high, for example, which usually causes the home to stay a long time on the market or possibly not sell. Inaccurate pricing can also lead to homes priced too low for their actual value which results in lost money to the seller.

SUMMARY OF INVENTION

Among its several aspects, the present invention recognizes that there is a need for new and improved tools and techniques that provide more accurate value analysis. To such ends, systems, methods, and computer program products for real estate property value analysis are described in the present invention. An embodiment of the present invention includes a method for generating a credible market value that is utilized to produce a listing price for a property with a reduced risk of a substantial reduction in the listing price before selling the property. Property data is imported from one or more databases having a plurality of properties for sale and that have been sold in a specified area which includes the subject property, selected comparable properties, and properties having multiple sales, wherein the property data includes property features, original listing prices, and a final listing price and sales price for each property that was sold and wherein the selected comparable properties are selected based on a relevance for comparison with the subject property. A market analysis process is run to produce relative market assessments. A residential value process is run including appreciation calculations based on the comparable properties having multiple sales to produce the credible market value, wherein the credible market value is supported by the relative market assessments and the appreciation calculations to thereby reduce the risk of a substantial reduction in the listing price before selling the property.

Another embodiment of the present invention addresses a method for assessing risk of incorrectly pricing a property. Information is imported on a plurality of properties including the subject property, each property having an original list price, a record of days on the market, and a final list price and sales price for each property that was sold. A graph is outputted of original list price difference to sales price according to a scale of percent a list price is above a sales price and a scale of days on the market. The graph comprises a first symbol plotted on the graph for each property that was sold representing the original list price percent above the sales price and a second symbol for each property that was sold representing the final list price percent above the sales price. Included in the graph is a first indication of a calculated number of days on the market prior to the start of a significant number of price changes and a second indication of a calculated average difference from a property's original list price to sales price for each property having the original list price the same as the final list price. The graph also includes a third indication of a calculated average difference from a property's original list price to sales price after the first indication for each property having the original list price different from the final list price and the third indication represents a risk of incorrectly pricing a property.

Another embodiment of the present invention addresses a computer-readable medium storing a computer program which causes a computer system to perform a method for generating a credible market value that is utilized to produce a listing price for a property with a reduced risk of a substantial reduction in the listing price before selling the property. Property data is imported from one or more databases having a plurality of properties for sale and that have been sold in a specified area which includes the subject property, selected comparable properties, and properties having multiple sales, wherein the property data includes property features, original listing prices, and a final listing price and sales price for each property that was sold and wherein the selected comparable properties are selected based on a relevance for comparison with the subject property. A market analysis process is run to produce relative market assessments. A residential value process is run including appreciation calculations based on the comparable properties having multiple sales to produce the credible market value, wherein the credible market value is supported by the relative market assessments and the appreciation calculations to thereby reduce the risk of a substantial reduction in the listing price before selling the property.

A more complete understanding of the present invention, as well as other features and advantages of the invention, will be apparent from the following detailed description and the accompanying drawings.

BRIEF DESCRIPTION OF DRAWINGS

FIG. 10 illustrates an exemplary comparables assumption page for selection of various options that affect a valuation in accordance with the present invention;

FIG. 13A illustrates an exemplary appreciation calculation page for use in editing and verifying appreciation calculations and presenting an average annual appreciation rate in accordance with the present invention;

FIG. 15A illustrates an exemplary risk assessment information page with user modifiable options in accordance with the present invention;

FIG. 16 illustrates an exemplary risk reduction results summary page in accordance with the present invention.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
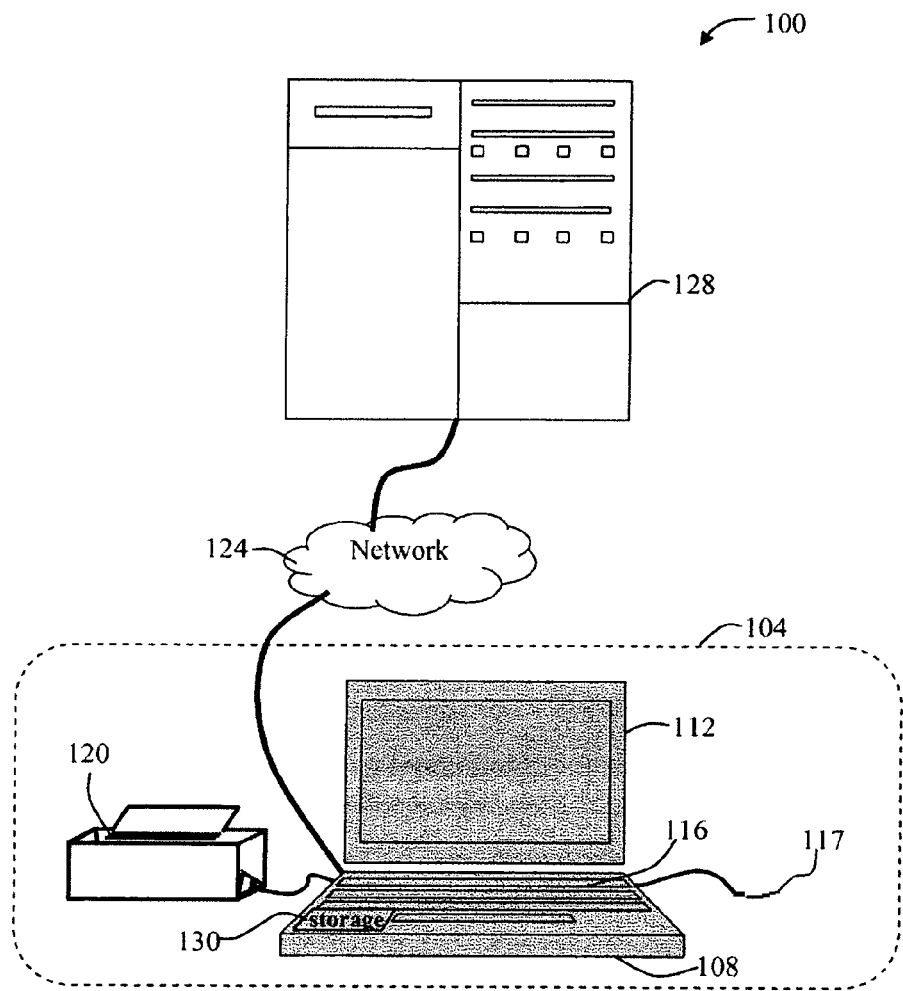
FIG. 1 illustrates an exemplary workstation system in accordance with an embodiment of the present invention.

FIG. 1 illustrates a workstation system 100 in accordance with an embodiment of the present invention. The workstation system 100 may suitably include a work station 104 consisting, for example, of a processor complex 108, such a personal computer, a laptop computer, or the like, having internal program storage 130, a monitor 112, a keyboard 116, a mouse 117, a printer 120, and may include other input or output devices, such as an external file storage device. The program storage 130 may store programs such as a risk reduction pricing program of the present invention or have access to such programs through such electronic media such as may be downloaded over the Internet from a server, accessed through a universal serial bus (USB) port from flash memory, accessed from disk media of various types, and the like. The work station 104 is connected to a network 124, such as the Internet or a local intra-net, for example. The network 124 is then further connected to a server 128 or a server farm, for example. The server 128 has access to a multiple listing service (MLS) database 140 which may be accessed by software programs stored in storage 130, for example. The server 128 may also store the master risk reduction pricing program and control distribution and licensing of the risk reduction pricing program to various registered users. A user may be, for example, a realtor, a person selling a property, the seller, or a person in the market to buy a property, the buyer.

Real estate value analysis systems, methods, and computer program products in accordance with the present invention as described herein provide price sensitivity analysis, residential value analysis, and methods to combine various analyses to identify risk associated with a range of prices. These programs may advantageously operate to accumulate data from a plurality of database formats and a plurality of assumption matrices for use in determining a value of real estate, such as residential or commercial real estate. Based on this data, calculations can be performed for determining the value of the real estate, provide pricing sensitivity, other comparison data, and various other values and data of interest. This information can be presented to a user in easy-to-understand tables, charts, graphs, and utilizing other suitable techniques for presenting data.

Assumptions can include client information, general assumptions, comparable assumptions, and feature value assumptions. Each of these assumptions includes initial default values and factors appropriate for the local market. General assumptions may include values for raw land, developed land values per acre, construction costs per square foot, costs for constructing basements and garages, and factors, such as, relative values for lot sizes, garage bays, square footage of living space and storage space. Comparable assumptions may include data relative to a particular property, which a user may enter which is not readily available in commercial databases, but which is known by the user as a result of his/her familiarity with the market. Feature value assumptions may include values for each conventional feature of a home, such as bedroom, bath, half-bath, bonus room, fireplace, deck, screened-in porch, type of siding, and values for various other conventional and non-conventional features. Factors may be used to generally scale a group of associated values or, for example, a factor that is assigned to each feature value, such as a bathroom or bedroom that represents a combination of the relative difference in resale value and new construction. In this way, the user may change the assumption values, such as a fireplace or full bathroom value, and the changed new construction value for that feature is automatically applied in associated calculations. This saves the user time in entering additional data, or performing extra manual calculations.

Value categories may include exemplary numerical calculations that are based on actual local area home sales information. Each of these calculations approximate the value of a subject property that has not yet been sold, based on characteristics of that property that are similar to properties that have recently sold and that therefore have an established market value.

A risk assessment process quantifies for the user the actual advantages of correctly applying the final value calculations and market analysis to establish an accurate asking price, as well as the disadvantages if these factors are disregarded when establishing the asking price. The risk assessment process illustrates to a user the impact of incorrectly pricing the user's property in terms of time on the market and potential revenue loss. By understanding the market dynamics and insight provided by the risk assessment, the process of establishing a final asking price for the property becomes reliable, consistent, and trusted.

Pricing sensitivity is calculated for the property's local environment and based on past sales information of homes in the area. For example, data is extracted from various databases for a plurality of homes in the area including, for example, actual price as sold, final asking price, original asking price and days on market. Calculations are performed to determine a relationship between the change in price for each home, based on the original asking price compared to the final asking price, and the time on market in which the change occurred. The data and analysis may be presented to a user in a number of advantageous formats.

Figure 2:
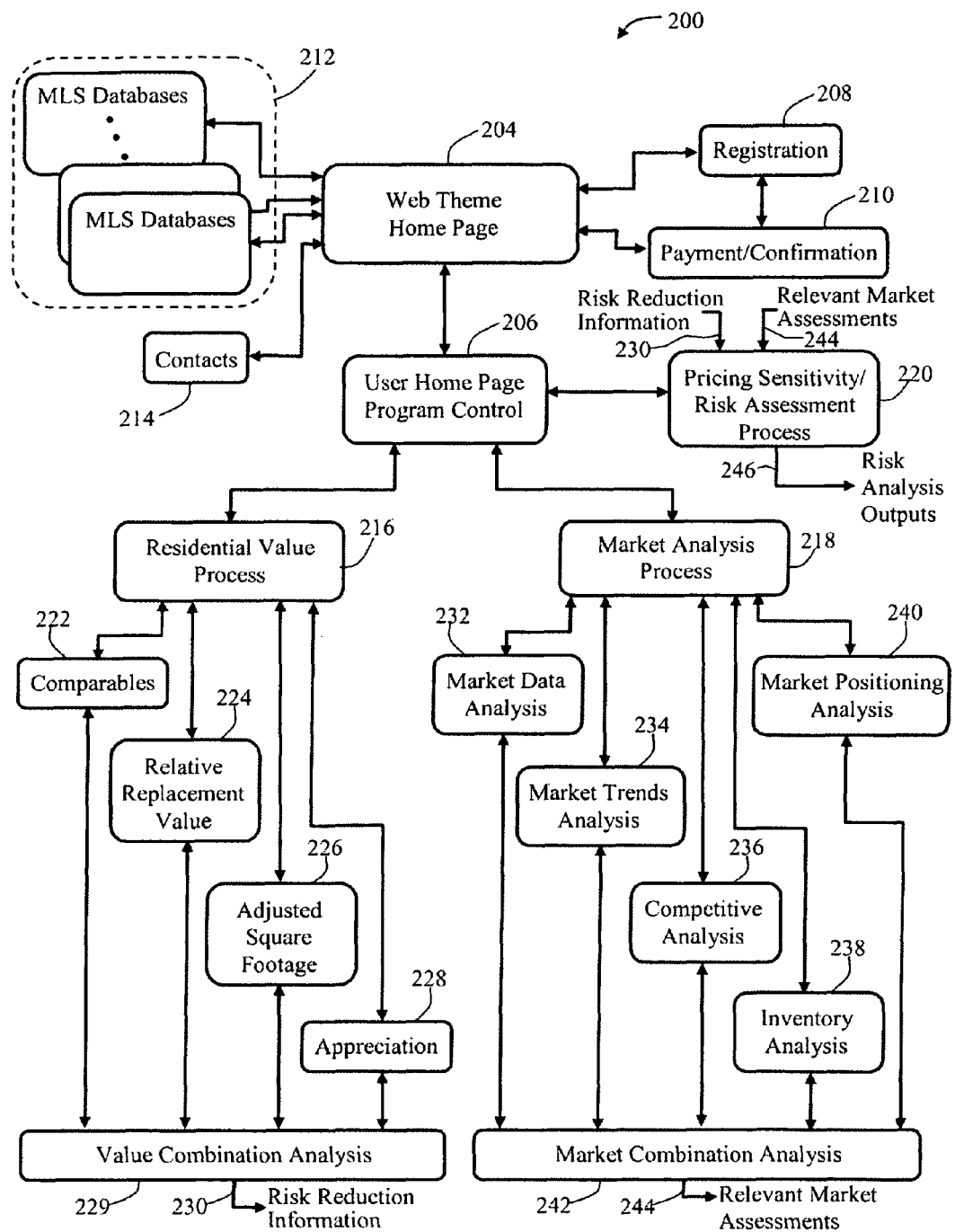
FIG. 2 illustrates an exemplary risk reduction pricing system in accordance with the present invention.

FIG. 2 illustrates an exemplary risk reduction pricing system 200 in accordance with an embodiment of the present invention. The risk reduction pricing system 200 includes an Internet web theme home page component 204 and a user home page program control component 206. The web theme home page component 204 provides a registration component 208 for registering a first time user of the risk reduction pricing system 200 and a payment and confirmation component 210 for accepting payments and confirming continued users valid access to the various system components. The web theme home page component 204 also provides an access path to a plurality of multiple listing service (MLS) databases 212 and other such databases where information on properties may be gathered, and an access path to contacts 214 for interacting on analysis and access to other information.

The user home page program control component 206 includes a residential value process 216, a market analysis process 218, and a pricing sensitivity and risk assessment process 220. The residential value process 216 utilizes, for example, a comparables process 222, a relative replacement value process 224, an adjusted square footage process 226, and an appreciation process 228. A value combination analysis process 229 automatically interacts with the four processes 222, 224, 226, and 228, to produce risk reduction information 230 as one of its outputs. For example, a weighted average of the values produced by the four processes 222, 224, 226, and 228 may be used to determine the risk reduction information 230.

The market analysis process 218, may suitably utilize, for example, a market data analysis process 232, a market trends analysis process 234, a competitive analysis process 236, an inventory analysis process 238, and a market positioning analysis process 240. A market combination analysis process 242 interacts with the five processes 232, 234, 236, 238, and 240 to produce user relevant market assessments 244.

The pricing sensitivity and risk assessment process 220 is utilized to quantify for the user the advantages of correctly applying the risk reduction information 230 with supporting analyses and the relevant market assessments 244 to establish an accurate asking price, as well as to illustrate the disadvantages if these factors are disregarded when establishing the asking price. Pricing sensitivity is useful for establishing the validity of the risk reduction information 230 and suggested listing price for a property. The pricing sensitivity and risk assessment process 220 may be used to show that incorrect pricing will lead to a loss of realized value when the property is either priced too low or too high. For example, if the property is priced too low, the property may be sold quickly but at a loss to the seller. If the property is priced too high, the property may not only fail to sell in a timely fashion, but may also lose value on a final sale as a result of lowering the price below market value in order to make up for the market perception of lost value when the property failed to sell in a timely manner. Risk assessment may be quantified in risk analysis outputs 246 and presented as display screens, graphs, and calculated data values, as described in further detail below.

Figure 3:
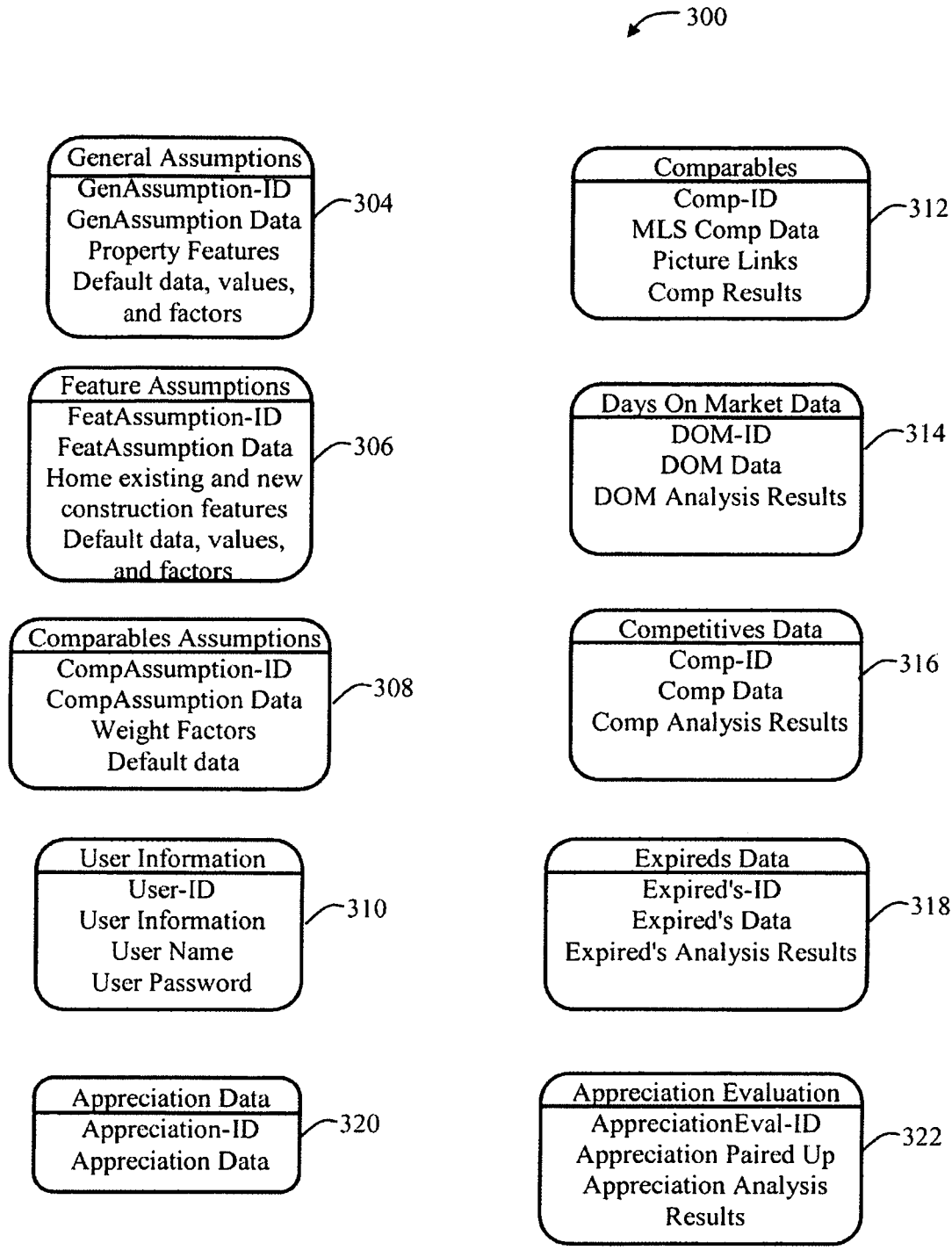
FIG. 3 illustrates an exemplary set of databases utilized in support of the risk reduction pricing system of FIG. 2 in accordance with the present invention.

FIG. 3 illustrates an exemplary set of databases 300 utilized in support of the risk reduction pricing system 200 of FIG. 2 in accordance with an embodiment of the present invention. Multiple different databases and multiple sets of assumptions are utilized to develop accurate and supported results. Databases include, for example, general assumptions 304, feature assumptions 306, comparables assumptions 308, user information 310, homes sold in the local area over the past six months, the past 12 months, and the past 5 years, including the home considered for purchase or sale, homes currently on the market in days on market data 314, homes whose market contracts have expired in expireds data 318, homes that have adjusted list prices, homes that have sold more than once, and the like. The databases are organized into tables and preliminary calculations are performed which provide the basis for the calculations that are described. User information 310 provides pertinent information such as user ID, name, password, and the like that are used to operate the risk reduction pricing system 200.

The general assumptions database 304, feature assumptions database 306, and comparables assumptions database 308 include default factors, which quantify the number, the relative values, and the actual values of the various characteristics and features of each individual home. The factors and values work together to determine the actual adjustments in total value required to accurately compare the various homes and to ultimately derive a value for the subject home. Each of these factors and values can be adjusted by the user to fit local market conditions. Changes may be highlighted for easy reference, new sets can be saved for specific market areas, and defaults can be easily restored at any time.

The general assumptions database 304 includes values for raw land, developed land per acre, construction costs per square foot, costs for constructing basements and garages, as well as, factors for the relative values of additional land, garage bays, square footage of living space and storage space, and the like. The general assumptions 304 is generally linked with the residential value process 216, the comparables process 222, and the relative replacement value process 224.

The feature assumptions database 306 includes data, factors, and values for each conventional feature of the home, such as bedroom, bath, half-bath, bonus room, fireplace, deck, screened in porch, type of siding and other conventional features and new construction factors and values. The feature assumptions database 306 is generally linked with the residential value process 216, the comparable process 222, and the relative replacement value process 224.

As with any updated feature values and general assumptions, the default values and factors can be automatically restored at any time by the user. Unique sets of these values, factors, and assumptions may be saved by the user for future use.

Comparables assumptions database 308 includes user defined characteristics and features which are not readily available in commercial databases but which are known by the user as a result of his or her familiarity with the market. User defined data includes, for example, provisions for entering the number of upgrades, capital improvements, special features, splitable lots, outbuildings, storage space, attic living space, type of siding, or the like. The comparables assumptions database 308 also includes a series of factors for weighting the comparable homes, which will be described in a later section. The user can adjust the influence of each comparable on the final average risk reduction price by changing the weighting percentage for each comparable. The comparable assumptions database 308 is generally linked with the residential value process 216, the comparables process 222, the relative replacement value process 224, and the adjusted square footage process 226.

Data from the general assumptions database 304, feature assumptions database 306, comparable assumptions database 308, and the database comprised of homes recently sold are placed on a central assumptions page as a repository for the data from various sources. The central assumptions page or links to a desired database may be used as the source or sources of data for the calculations of final adjustments to actual selling prices based on the assumed values of calculated differences between homes.

The days on the market (DOM) database 314, competitive database 316, and expireds database 318 generally are linked with the market analysis process 218 and may be accessed by the pricing sensitivity and risk assessment process 220. The DOM database 314 is also generally linked with the market data analysis process 232, market trends analysis process 234, and inventory analysis process 238. The competitives database 316 is also generally linked with the competitive analysis process 236 and the inventory analysis process 238. The expireds database 318 is also generally linked with the competitive analysis process 236.

The comparables process 222, the relative replacement value process 224, the adjusted square footage process 226, and the appreciation process 228 utilize actual local area home sales information. These processes approximate the value of a subject property that has not yet been sold, based on characteristics of that property that are similar to properties that have recently sold and that therefore have an established market value.

The comparables process 222 manipulates data from a database, such as the comparables database 312, consisting of the subject residence in question and the recent sales of homes that are similar to the subject residence. The recently sold homes that are similar are called comparables. The comparable data includes list prices, actual selling prices, dates of sale, square footage, days on market, and also individual features of each home, including number of bedrooms, garage and number of bays, number of full bathrooms and half bathrooms, bonus rooms, decks, screened in porches, basement space, attic space, separate storage space, size of lot, year built and the name of the housing development if any. The comparables database 312 is also generally linked with the residential value process 216, the relative replacement value process 224, and the adjusted square footage process 226.

The user chooses, for example, a number of homes, such as six homes, from the comparables database 312 of recently sold homes that are most similar to the subject home and the above data is compared for each home with the subject residence. While a typical user may choose three homes, choosing a large number of comparable homes may not improve the accuracy of the analysis, though the program is not limited to three or six homes and a user may choose nine or more homes, for example. Values are assigned for each feature and where features differ, the appropriate value is applied to quantify the difference. For example, if a subject home with three bedrooms is compared to a home with two bedrooms that has sold recently for $100,000, but is otherwise comparable to the subject, an amount representing the value of a bedroom, for example $3,000, will be added to the sold price of the comparable. In this example, a final adjusted value of $103,000 would fairly represent the expected price for the two bedroom home adjusted for an additional bedroom. Since the subject home was comparable in every other way, except that it had an additional bedroom, the three bedroom subject home is perceived by the market as having more value than the similar home with only two bedrooms. In actual practice, these calculations become somewhat complex because of the large number of features that can differ for each home and the number of homes being analyzed.

In addition to the specific feature values, there are values for general conditions that affect all properties equally, such as appreciation and depreciation (A and D). These A and D values are also applied to each of the comparables and subject residence being analyzed and calculations are automatically made for the differences in the dates sold, appreciation, and for the differences in the ages of the properties, depreciation. For example, if a subject home was built in 1985 and a comparable was chosen that was built in 1987, the value of the comparable is adjusted for each year difference by an appropriate rate of depreciation. The comparable analysis adjusts the comparable to be closer to the subject by assigning values to differences between the homes and applying them. In this process, the comparable analysis makes no adjustment to the subject. Rather, appropriate values are subtracted from the chosen comparable when it is considered superior to the subject or appropriate values are added to the chosen comparable when it is considered inferior. In this example, the subject is two years older than the chosen comparable, which makes the chosen comparable superior in regard to the age difference. With a depreciation rate of 0.5% year, the process would reduce the value of the chosen comparable by 1% to make it closer in value to the subject.

Values are assigned by model defaults, but any or all of the values can be changed by the user to accommodate market conditions. There are default factors that are used to adjust feature costs and replacement home costs due to new construction values, which can also be changed by the user. In addition, there are factors representing a value of main area square footage, a value of below grade square footage, a value of unheated space, a value of storage space, a value of lot size, a value of splitable lots, a value of one or more upgrades to a property, a value of construction materials used in the construction of the property, a value of one or more capital improvements, a value of the land, a value of a swimming pool or hot tub, a value of detached housing or storage space located on the property, and values for miscellaneous special features, with options for the user to include them in the analysis or not, and the like. For example, a lot size factor set to a 1.0 indicates that any difference in lot size between the subject property and a comparable property is automatically adjusted by a value per acre. A lot size factor set to a 2.0 indicates that any lot size difference of less than 2 times the subject lot size requires no adjustment. In another example, a new garage bay may cost $13,000 while a resale factor of 0.5 indicates that only $6,500 may be used to adjust a property value for comparison purposes.

When all of the differences in features and feature values are accounted for, the comparables process 222 calculates a new value for each of the six comparable homes, which is called the final adjusted value. The effect of the adjustments is that the comparable homes will now approximate the subject home and the final adjusted value of the comparables will represent the value of the subject home. By using several comparables, the effect of approximations are minimized, for example, by averaging the final adjusted values.

Each comparable home can be weighted by the user relative to its overall similarity to the subject by entering the desired weight in the comparable assumptions database 312. In this way, the user can achieve considerable accuracy in his or her estimates by calculating a weighted average of all adjusted values. Any or all of these values, factors and weightings can be adjusted by the user and new values easily calculated, so the user can readily determine those factors with the most effect and those factors with the least effect on the total analysis. In this way, the user can also account for changes in market conditions.

The final adjusted values for each comparable are averaged, a median is calculated and a weighted average is also determined in the comparables process 222. The results may be displayed graphically and each of the comparable homes and the subject may also be displayed in a report, including photographs, descriptions, tables of reference data, and a comparison of features. The results are also entered into a program that is used to calculate the final range of values and the recommended risk reduction price, a credible market value that is utilized to produce a listing price for the property with a reduced risk of a substantial reduction in the listing price before selling the property. For example, the credible market value may be used to assist a client, such as a seller of a property, in choosing the listing price, which may be the same or close to the recommended risk reduction price.

The relative replacement value process 224 calculates a construction value per square foot ($C\$/ft^2$) based on relevant new home sales figures in the database and applies the $C\$/ft^2$ value to the listed square footage of each comparable home and for the subject home. New construction values, using the factors previously described for any special features are also added for each comparable home as they may apply, such as decks, upgrades, bonus rooms, garages, pools, basements, outbuildings, land value differences and an estimate of new construction cost is derived. The new construction cost for each comparable home is compared to the actual sold price for each home and a percent difference is determined. The percent differences of the comparable homes are then averaged and adjusted using comparable weighting values. The weighted average percent difference between new construction value and actual selling price is applied to the calculated new construction value of the subject home and an estimated selling price is derived for the subject home based on this comparison. The results may then be displayed graphically and in tabular form. Further, the results are utilized to calculate price ranges and a final calculated value. The final calculated value represents a value based on replacement value and is used as one of the factors in determining the final "real value".

The adjusted square footage process 226 calculates an adjusted value per square foot for each comparable, based on the final adjusted value as calculated in the Comparable Analysis section. For example, with a final adjusted value of $250,000 for a property with 2,000 square foot main area and 500 square foot basement or below grade area, a $/sqft may be calculated at $250,000/2,500 which is equal to $100/sqft. This square footage value may be adjusted by use of factors such as a factor of 1.0 for main area square footage and a factor of 0.5 for below grade square footage. By using the factors, an effective square footage of 2,000*1.0+500*0.5 equals a 2,250 effective square foot value and a $250,000/2,250 value of $111/sqft. Since the main area factor was 1.0 the 2,000 square foot would also be the effective square foot area. The below grade area would have an effective sqft of 250 sqft instead of 500 sqft. The value for the main area using an adjusted sqft value would be 2,000*$111.11/sqft equals $222,220 and the below grade area would be 250*$111.11/sqft equals $27,780. The adjusted $/sqft for the below grade area is $27,780/500 which equals $55.56/sqft.

Using these values for a comparable property of 2,000 sqft main area and 500 sqft basement area, the value of the comparable property may be adjusted for comparison with a subject property having a 2,500 square foot main area and no below grade area. The adjustment for the main area would take the 2,500 square foot main area minus the comparable 2,000 sqft main area providing a 500 sqft*$111.11/sqft adjustment of +$55,555. The below grade adjustment would be calculated as 0 sqft minus 500 sqft providing a negative 500 sqft*$55.56/sqft adjustment of $27,780. Combining the main area and below grade area adjustments provides $55,555-$27,780 or a $27,775 adjustment. The square foot adjusted comparable would be $250,000+$27,775 which is equal to $277,775.

The range of values represented by the square footage value calculation for each comparable home is averaged using comparable weights and compared to the subject. The weighted average square footage value of the comparables is then multiplied by the square footage of the subject. The result is a listing price for the subject that is based on the adjusted square footage values of the comparables. The results may be displayed graphically and in tabular form and are utilized in determining the final recommended listing price representing a credible market value.

Figure 4:
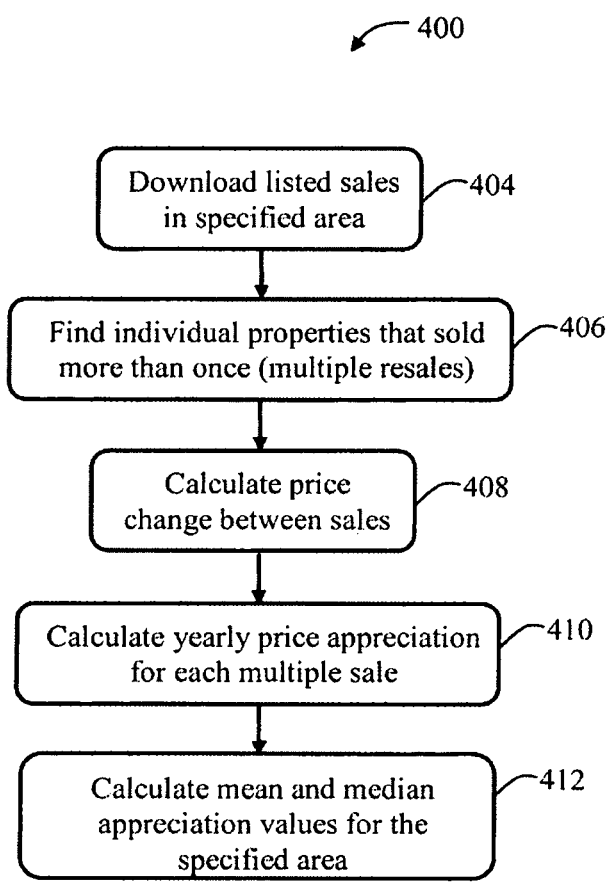
FIG. 4 illustrates an exemplary appreciation process in accordance with the present invention.

The appreciation process 228, associated with the appreciation data 320 and the appreciation evaluation database 322, determines an actual area appreciation by selecting a list of homes in the local area, for example, the neighborhood housing development, local street, or other defined area, where comparable homes have sold more than one time. The appreciation process 228 comprises a series of steps where the second sale is compared to the first sale and an annual rate of appreciation is calculated for each property by determining the actual monetary value difference divided by the exact number of years between sales to obtain a percentage of the annual appreciation amount over the original selling price. This calculation is repeated for all the properties in the area that have sold more than once. The percentages for each home are then averaged and a median is also determined. For example, an exemplary appreciation process 400 is shown in FIG. 4. At step 404, the listed sales in the specified area are downloaded for processing. At step 406, individual properties that sold more than once, termed multiple resales, are found. At step 408, a price change between sales is calculated for each of the multiple resales. At step 410, a yearly price appreciation is calculated for each multiple sale. At step 412, a mean value and a median value of the set of individual appreciation values are calculated to represent the mean and median appreciation values for the specified area. This median percentage may then be applied to the previous (or original) selling price of the subject home to determine a value for the home relative to local area appreciation.

The user may elect to use the median percentage or the average percentage. In those cases where sufficient data are not available to calculate the local area appreciation, the user may use a value calculated for the next larger area, or the user can elect a pro form a value for appreciation to complete the calculation. The result may be displayed graphically and in tabular form and is utilized in determining the final estimated range of values and the final recommended listing price representing a credible market value.

The value combination analysis process 229 calculates a set of final recommended prices by averaging the results of the four processes 222, 224, 226, and 228. A weighted basis is used, which sometimes varies, but may be calculated by (2× weighted average of comparables+replacement value result+appreciation value result+square footage value result+median value of comparables) divided by 6. These results may also be displayed graphically and in tabular form.

The market analysis process 218 may suitably include market data analysis process 232, market trends analysis process 234, competitive analysis process 236, and inventory analysis process 238. These processes are used to aid the user in determining the reasonability of the final recommended listing price by providing a visual comparison of the final recommended listing price with relevant current market conditions.

The market data analysis process 232 calculates local area market data based on a database of local area sold homes for a minimum of the previous three years, but normally the previous five to ten years. The sales are plotted as to price and time on the market, averages are calculated for price and time on market and the subject comparable values as previously calculated are displayed on the plot for reference. This visual display is an aid in evaluating the price calculation in the context of the relevant historic market data.

In addition, the actual sales prices of the evaluated homes are individually calculated with respect to the original asking price and a percentage variance is determined of actual selling price from original asking price for each of the several hundred homes in the database. These percentages are then plotted with respect to time on the market and an average percentage and a linear regression analysis are performed and plotted with the same data. This data illustrates the general importance of establishing an asking price for the property that approximates the actual value of the property within the limits suggested by the outcome of the actual selling price to asking price analysis.

The market trends analysis process 234 calculates local area market trends by plotting the actual selling price of each of the several hundred home sales in the area versus time on the market. A linear regression analysis is performed in order to determine the long-term trend in prices over three to ten years, for example, and a short-term trend analysis is also plotted to determine market fluctuations and to illustrate the current market conditions. The subject risk reduction information 230 including a suggested listing price as determined from the residential value process 216 is plotted on this chart so the user has a visual illustration of the relationship of the suggested listing price to long term market trends, as well as, to current market conditions.

This same data is also plotted for the price per square foot for each of the several hundred homes in the database and the subject home is plotted on this chart as well. The user can then readily visualize the relevance of the suggested risk reduction listing price on a per square foot basis to the long term trends. The suggested risk reduction listing price can also be compared to the current market conditions for actual sold prices per square foot for a very large sample and possibly for all listed homes in his local area.

The competitive analysis process 236 extracts the homes currently on the market from the active listing and expired listing databases and plots the homes with respect to time on the market and asking price so that the user can determine quickly what competitive prices are being offered. A price per square foot is also calculated, plotted, and displayed for each home. The subject property recommended risk reduction listing price is plotted on the same chart so that the user can readily determine the relevance of the suggested risk reduction listing price to the competitive prices.

The same information is also gathered, calculated and plotted separately for those properties that have expired, or failed to sell, and have recently been removed from the market, so that the user can determine the relevance of the suggested value to properties that did not sell, possibly because the price was incorrect.

An inventory analysis process 238 is performed for the local area by extracting homes from the database that have sold in the previous twelve months and also extracting homes that are currently on the market. From these two populations, a calculation is made as to how many months of inventory are currently on the market and how many months of inventory of homes similar to the subject home are on the market. The results of these calculations are compared to determine the relative strength of the market, for example, whether the market favors buyers or sellers. These results may also be displayed graphically and in tabular form.

For example, these calculations are performed by determining the number of homes sold per month in categories, such as, total sales and sales similar to the subject by dividing each category by twelve months. The number of homes sold per month for each category is then divided into the number of homes currently on the market in each category to determine the number of months of inventory represented by the homes currently on the market. In some cases, seasonal adjustments may be made based on historical sales data so that a more accurate representation of the months of inventory may be made, relative to the current month of the year. These results are also displayed graphically and in tabular form and are very helpful in illustrating the probability of selling the subject home based on the months of inventory currently on the market. This data is very helpful in determining the pricing strategy.

The data from the market data analysis process 232, market trends analysis process 234, the competitive analysis process 236, and the inventory analysis process 238 are also plotted and may be combined to show actual prices of homes sold in the last 12 months and currently on the market by price and by size and also by price per square foot and by size in accordance with the present invention. The subject price range as well as the actual suggested risk reduction listing price is also displayed so that the user can quickly perceive the relevance of the suggested risk reduction listing price to the sales that have recently occurred as well as to the homes currently on the market. Each of the market tools separately and combined present positioning information that is an important aspect in determining the relevance of any suggested price.

Figure 5:
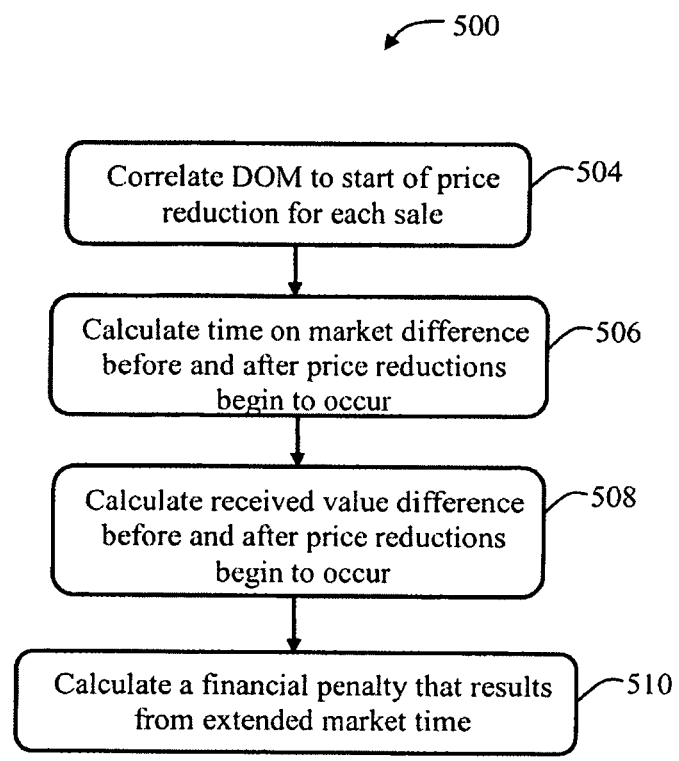
FIG. 5 illustrates an exemplary pricing sensitivity and risk assessment process in accordance with the present invention.

The pricing sensitivity and risk assessment process 220 extracts data for the homes listed in the area including original asking price, final asking price, actual sold price, and days on market. Calculations are performed to determine the relationship between the change in price for each home from the original asking price to the final asking price and the time on the market that the change occurred. An exemplary pricing sensitivity process 500 is shown in FIG. 5. At step 504, the number of days on the market (DOM) to start of price reductions for each sold home is correlated. At step 506, a time on the market difference is calculated before and after significant price reductions have started for sales without price changes and sales with price changes. At step 508 a received value, an actual price received on a sale, difference before and after price reductions begin to occur is calculated. At step 510, a financial penalty is calculated that results from extended market time. The extended market time is generally due to having priced a property high enough that the seller is forced to change the asking price in order to entice offers.

In particular, the original asking price data is plotted together with the final asking prices. The day that the first significant changes occur in the asking price is also plotted. For example, list prices that are considered too high are usually adjusted lower by the sellers. The first day that several such changes occur together is the day that marks the beginning of any significant changes. Such a change in asking price, generally occurs within the range of 25 to 50 days on the market. The average percentage difference between asking price and actual selling price for the period before prices started to change is calculated and compared to the average percentage difference between original asking price and selling price for the period after prices started to change. The average time on the market is also determined for each period as is the average price per square foot determined for each period. Based on this information, a price range and a corresponding range of time on the market to sale of the subject property may be predicted at step 510.

The pricing sensitivity and risk assessment process 220 results are displayed graphically and in tabular form. The graphs illustrate the differences in time on market and realized value for those homes that were priced incorrectly as compared to those homes and were forced to change their price and were, by definition, priced incorrectly. One of the calculations that is done averages the days on market (DOM) for homes that did not make a price change and compares that to the average DOM for homes that did make a price change. The difference has been found to be usually 3× or more, with the home having no price change having a shorter DOM. This data is extremely helpful to the user in determining the actual asking price relative to the recommended listing price based on his or her objectives for timeliness of sale and total realized value. One of the ways a realized value may be calculated is as a dollar amount penalty for mispricing a home. This penalty can be very powerful to illustrate why overpricing may actually cost a seller money. This important element of the pricing system provides a seller with very convincing data that is persuasive to adhere to the value analysis in determining the selling price and is of great assistance to the agent in reducing the number of days a home remains on the market.

Figure 6A:
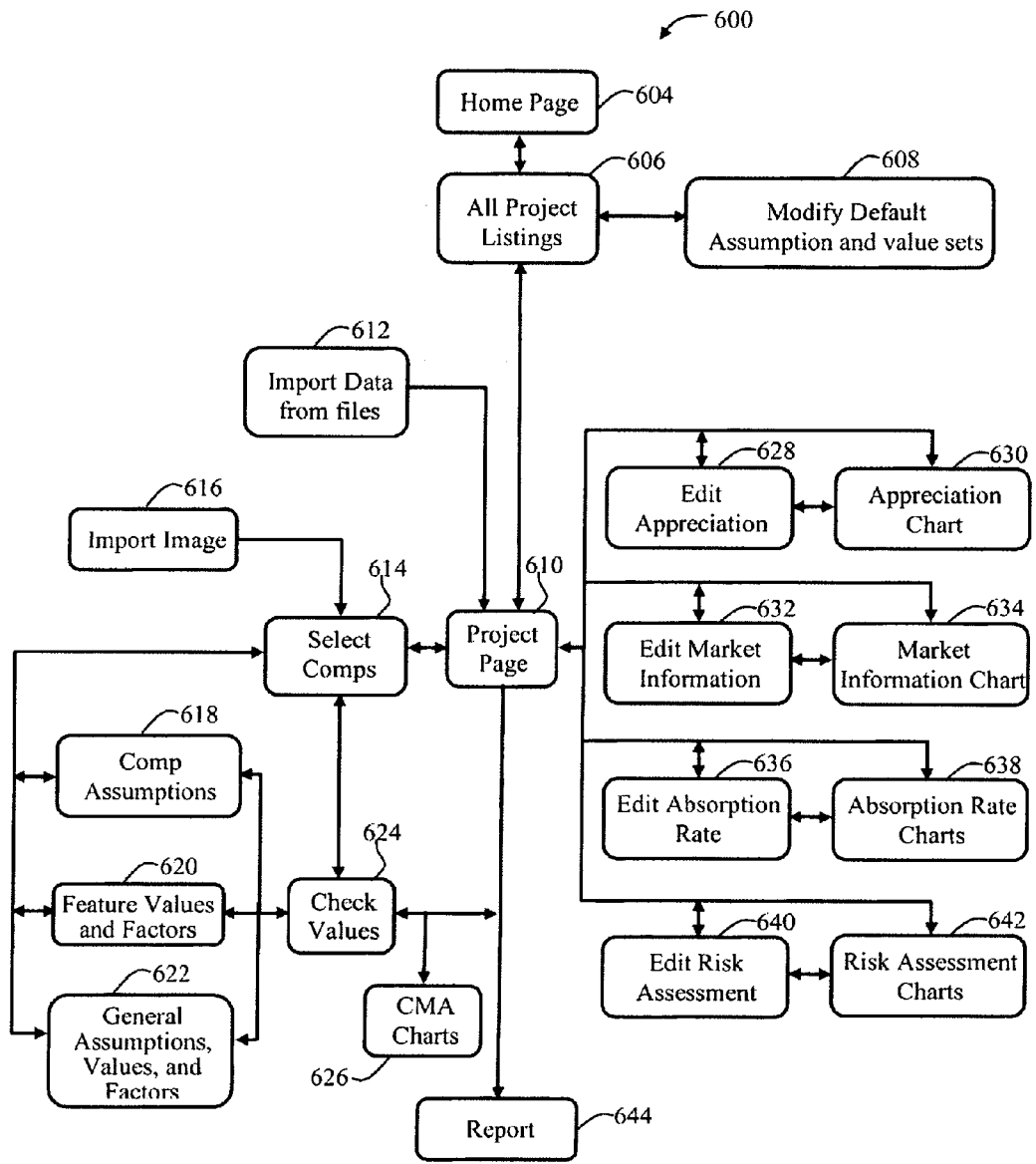
FIG. 6A illustrates an exemplary risk reduction comparable market analysis (CMA) website organization in accordance with the present invention.

FIG. 6A illustrates an exemplary risk reduction comparable market analysis (CMA) website organization 600 in accordance with the present invention. The risk reduction CMA website organization 600 may have an initial home page 604 for user registration, program information, support links, navigation aides to the various tools, databases, and programs, and the like. Accessible from the home page 604 is an all projects listings page 606. The all projects listings page 606 lists all current projects for editing options and offers a choice to start a new project.

Figure 7:
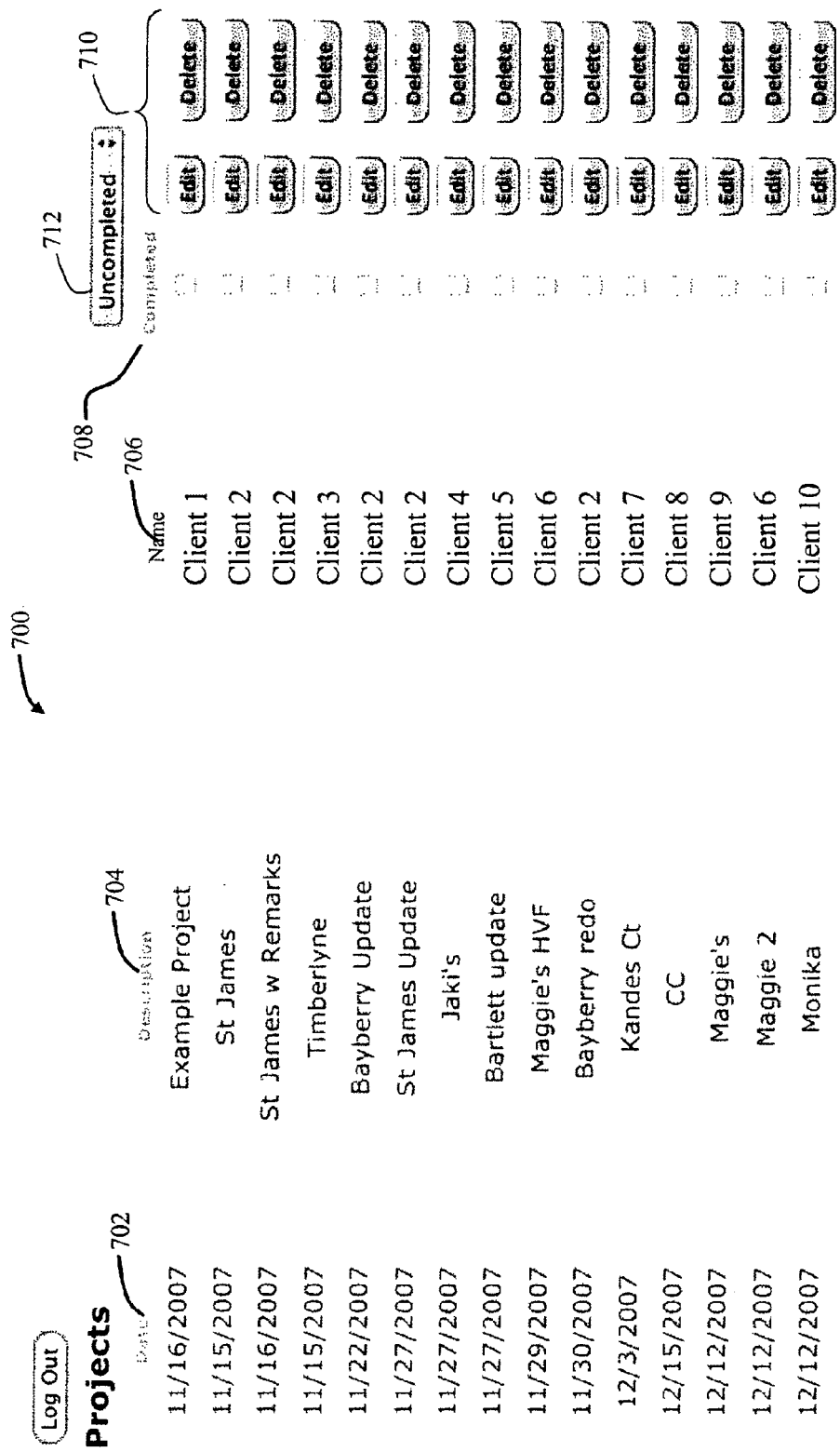
FIG. 7 illustrates an exemplary all project listing web page of current projects for access to edit or enter a new project in accordance with the present invention.

FIG. 7 illustrates an exemplary all project listing web page 700 as an example of the all projects listing page 606. The all projects listing web page 700 illustrates current projects for access to edit or enter a new project in accordance with the present invention. The listing includes information such as date 702 the project was started, a brief description of the property 704, such as street address, a client name 706, a user entry box 708 associated with the project to indicate if the project information has been completed, edit and delete action buttons 710, and access to uncompleted projects through an uncompleted action button 712.

In FIG. 6A, the links 608 are provided to edit a general assumptions, values, and factors page 622 and a feature values and factors page 620 and the like. For example, the edit and delete action buttons 710 of FIG. 7 provide a link to a page selectable through a drop down menu box, such as the general assumptions, values, and factors page 622.

Figure 8:
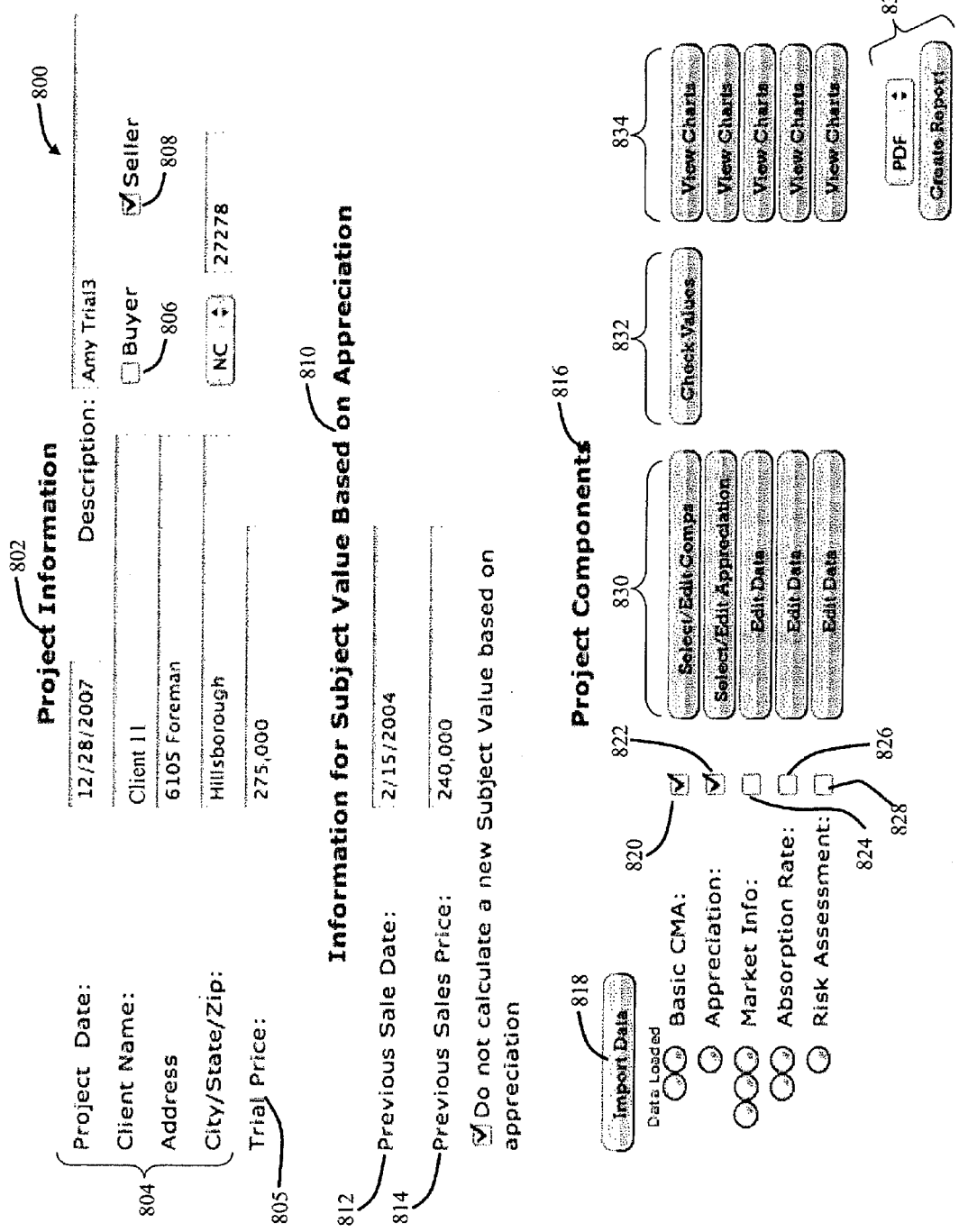
FIG. 8 illustrates an exemplary selected project page acting as a central navigation point for access to databases and functions of the risk reduction comparable market analysis (CMA) system in accordance with the present invention.

The project page 610 provides project information for the selected project and specific navigation aides to the various tools, databases, and programs. FIG. 8 illustrates an exemplary selected project page 800 as an example of the project page 610. The selected project page 800 is a central navigation point for access to databases and functions of the risk reduction CMA system in accordance with the present invention. The selected project page 800 includes, for example, project information 802 for the selected project such as project date, client name, address 804. A trial price 805 may also be entered. A user selectable box for buyer 806 and for seller 808 is also provided. As an example, the user selectable box for seller 808 is checked.

The selected project page 800 also includes an "information for subject value based on appreciation" section 810. In section 810, a date can be entered into a previous date of sale entry box 812 and a price entered into a previous sales price box 814. The selected project page 800 may also include a project components section 816. In section 816, an import data action button 818 allows a user to import data. Five or more project functions can be selected by checking an entry box for processing or the editing of data as required. These project functions include a basic comparables market analysis (CMA) 820, an appreciation calculation 822, providing market information and analysis 824, an absorption rate analysis 826, and a risk assessment analysis 828. A market position analysis and other analyses (not shown) may also be included. Action buttons 830 provide a user with further flexibility in the processing and editing of data for the five project functions. A check values action button 832 allows a user to check data that were used and calculations results of the selected function's. A user may then choose to view a particular chart/s by selecting one of the action buttons 834. A report may be created, such as a market position analysis report and chart, and type of print out selected through action buttons 836.

Returning to FIG. 6A, links 612 are provided to import data for the various properties used in the risk reduction analysis, for example, one link may be to an MLS database for access to property information. A select comparables page 614 provides detailed information for subject and comparable properties from which a user selects the most appropriate comparable property.

Figure 9:
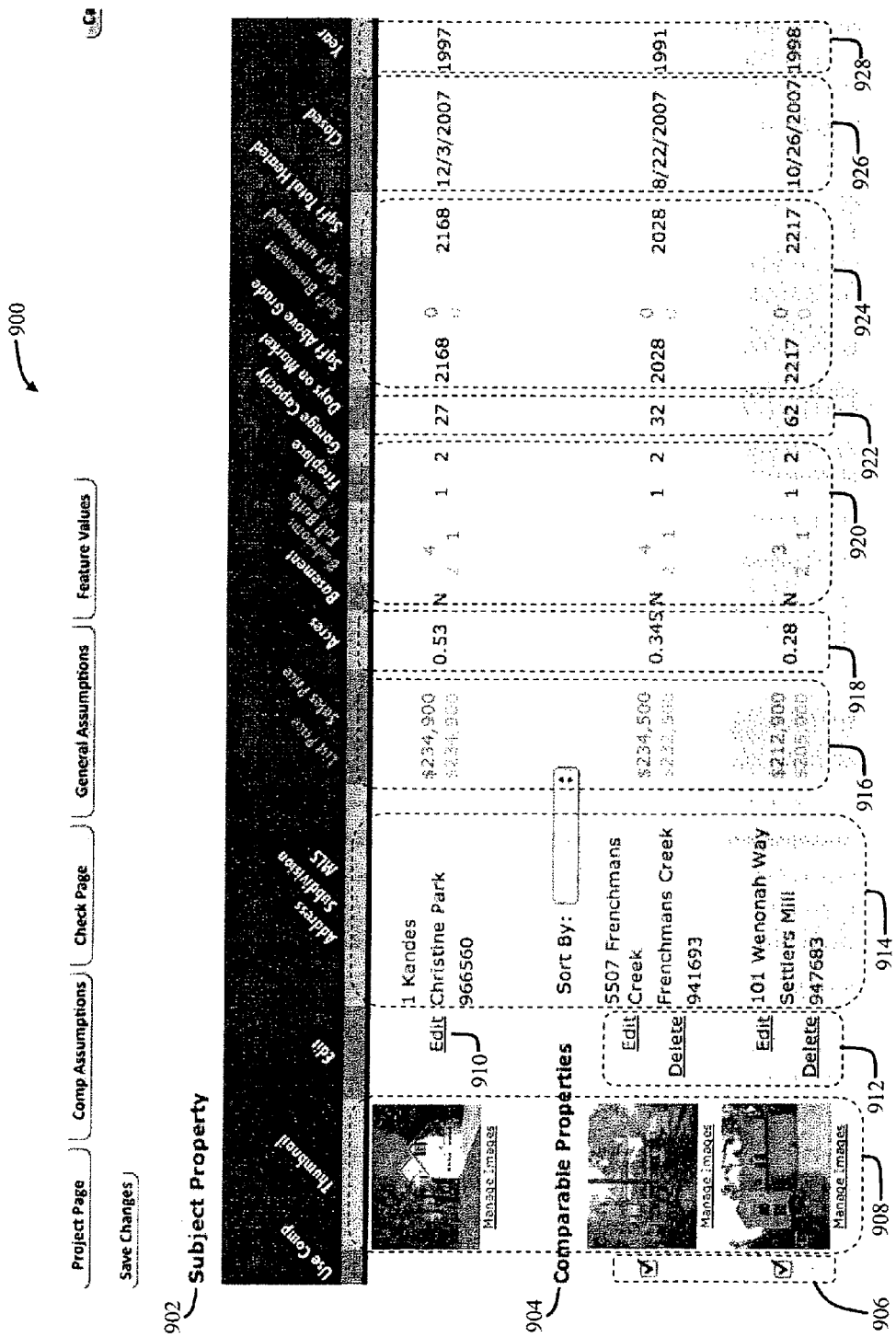
FIG. 9 illustrates an exemplary comparables selection page for selection of comparable recently sold properties in accordance with the present invention.

FIG. 9 illustrates an exemplary comparables selection page 900 as an example of the select comparables page 614. The comparables selection page 900 provides a user for selection of comparable recently sold properties in accordance with the present invention. The comparables selection page 900 includes a subject property section 902 and a comparable properties section 904. Properties may be compared against the subject property and then may be selected to use the comparable property in the risk reduction analysis with select boxes 906.

Both the subject property section 902 and the comparable property section 904 include an image thumbnail 908 of the listed property. An import image link 616 to image files is provided so that a user may import a separately accessible image file if a basic data source is missing an image or if an old image is to be replaced by a new image. The subject property may be selected for editing by selecting an edit action button 910 and the comparable property may be selected for editing or deleted by selecting the appropriate action buttons 912. The listed properties may also include an address, subdivision if appropriate, and an MLS listing number in information group 914 and lot size in information group 918. The listed properties may also include a listing price and a sales price in information group 916. The properties are further identified by comparing various features such as whether the property has a basement, number of bedrooms, number of full baths, number of half baths, whether it has a fireplace, and the capacity of a garage, for example, in information group 920. The number of days on the market is listed in information group 922, and the square footage above ground, in the basement, for unheated space, and the total heated space are listed in information group 924. The closing date is listed in information group 926 and the year built is listed in information group 928. As an example, a closing date for the subject property is automatically adjusted to a report generation date, since many of the calculations, such as the appreciation calculation, are current to the report generation date.

Figure 10:
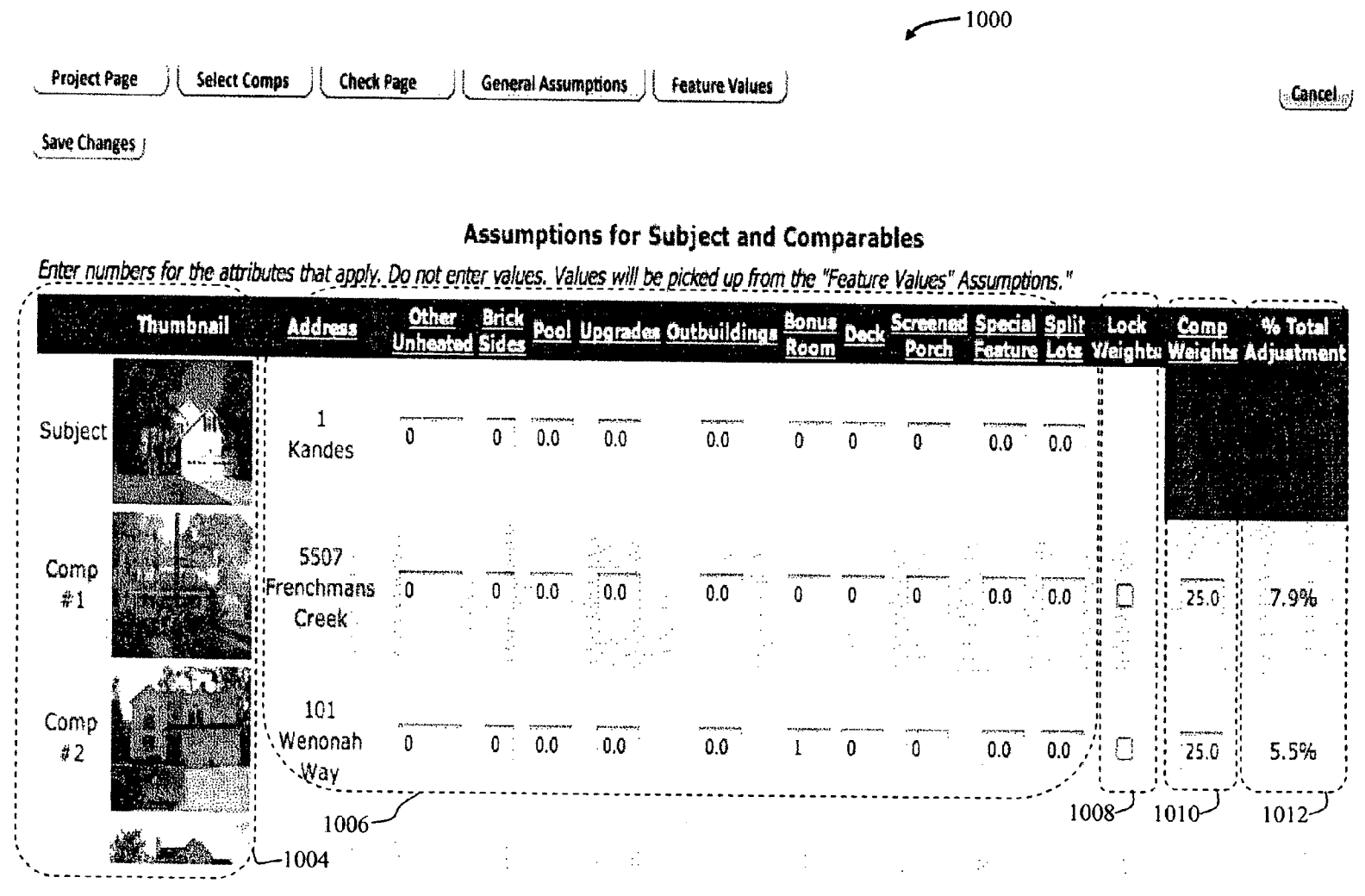

Returning to FIG. 6A, a comparables assumptions page 618 displays comparables chosen by a user and offers options to change or add information that may affect the overall value. FIG. 10 illustrates an exemplary comparables assumption page 1000 as an example of the comparables assumption page 618. The comparables assumption page 1000 provides for selection of various options that affect a valuation in accordance with the present invention. The comparables assumption page 1000 includes, for example, an image and address for the subject property and each selected comparable property in information group 1004. The features of the subject and comparable properties are entered in entry boxes within information group 1006. Lock weights entry boxes 1008 are provided for each of the comparable properties to control whether weights are entered by a user or calculated according to the user's instructions. This feature enables the user to assign a weight to one or more properties and the computer, such as workstation 104 of FIG. 1, will automatically calculate the remaining property weights when the user selects a "distribute weights evenly" feature so that the total of all weights equals 100%. With many comparables, this feature minimizes a user's time in preparing the data for calculations. A comparable weighting factor may be entered in entry boxes 1010 which may be used to apportion the "value" of a comparable in the group of selected comparable properties. Also, a percentage total adjustment 1012 is calculated and displayed for each selected comparable property. The percentage total adjustment is the total of the adjustments on a comparable property divided by the sold price. These percentages for the comparable properties are helpful in determining the best comparable property, since a lower % total adjustment can be interpreted to mean the comparable is more like the subject property. These percentages are calculated, as are all other values, as soon as comparable properties are selected.

Figure 11:
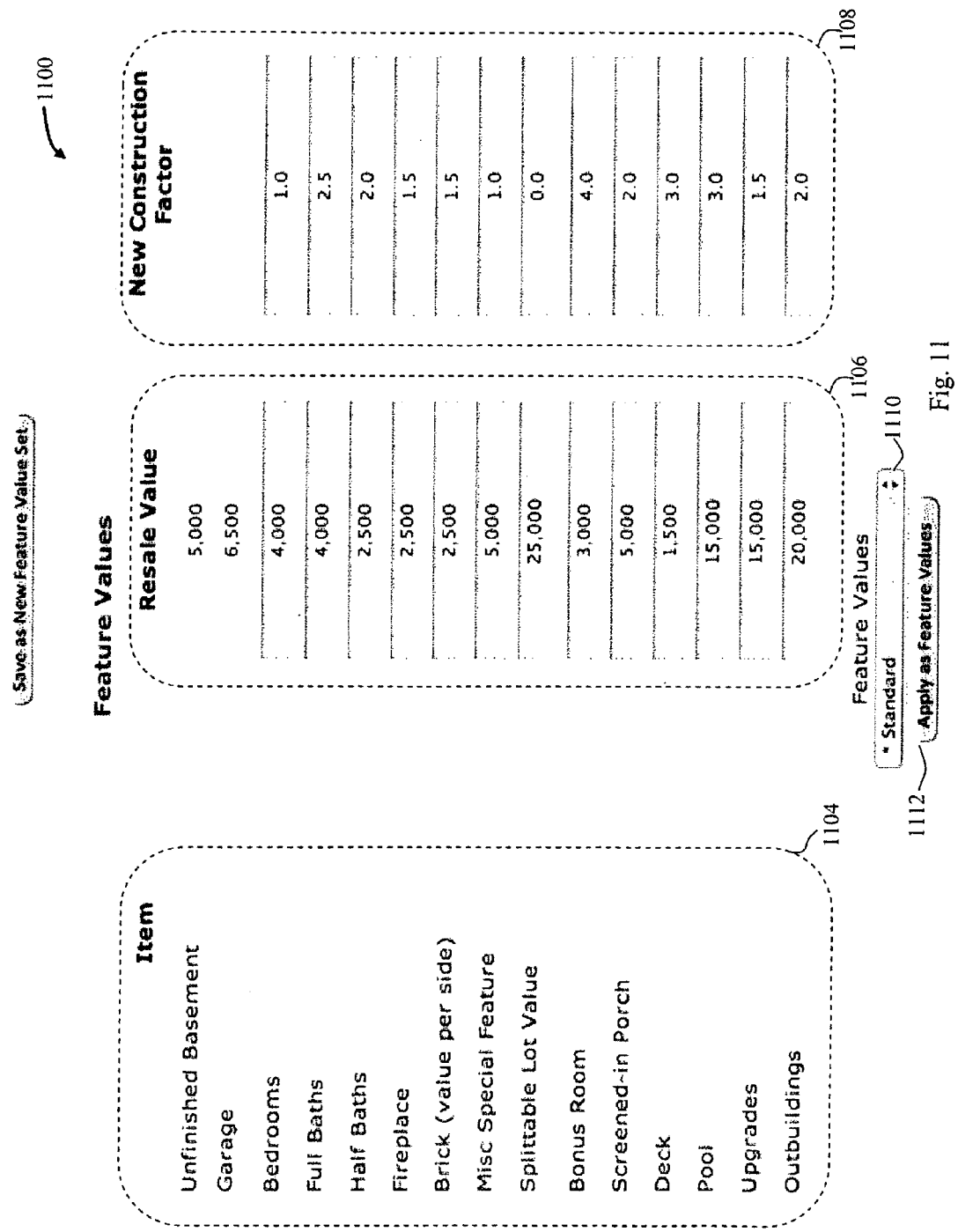
FIG. 11 illustrates an exemplary feature values page for entry and edit of various feature factors and values of a property in accordance with the present invention.

Returning to FIG. 6A, a features values and factors page 620 assigns user modifiable values to the basic features of a property that affect value, such as a fireplace, full baths, extra bedrooms, and the like. FIG. 11 illustrates an exemplary features values page 1100 as an example of a features values and factors page 620. The features values page 1100 provides for entry and editing of various feature factors and values of a property in accordance with the present invention. The features values page 1100 includes, for example, a features list 1104, a resale value list with resale values associated with appropriate and corresponding features in the features list 1104, and a new construction factor list 1108 for a listing of upgrade factors for new construction of the various features in the feature list 1104. For example, having brick siding may have a resale value of $2,500 per side while the cost of construction for each side is estimated to be 1.5 times the resale value or 1.5*$2,500=$3,750 per side. Standard values or default values of selected features may be obtained from selecting a standard feature value action box 1110. Various feature value sets may also be selected through a drop down menu box when selecting action box 1110. Once feature values are entered they may be applied to the risk reduction analysis by selecting a "apply as feature values" action box 1112.

Figure 12:
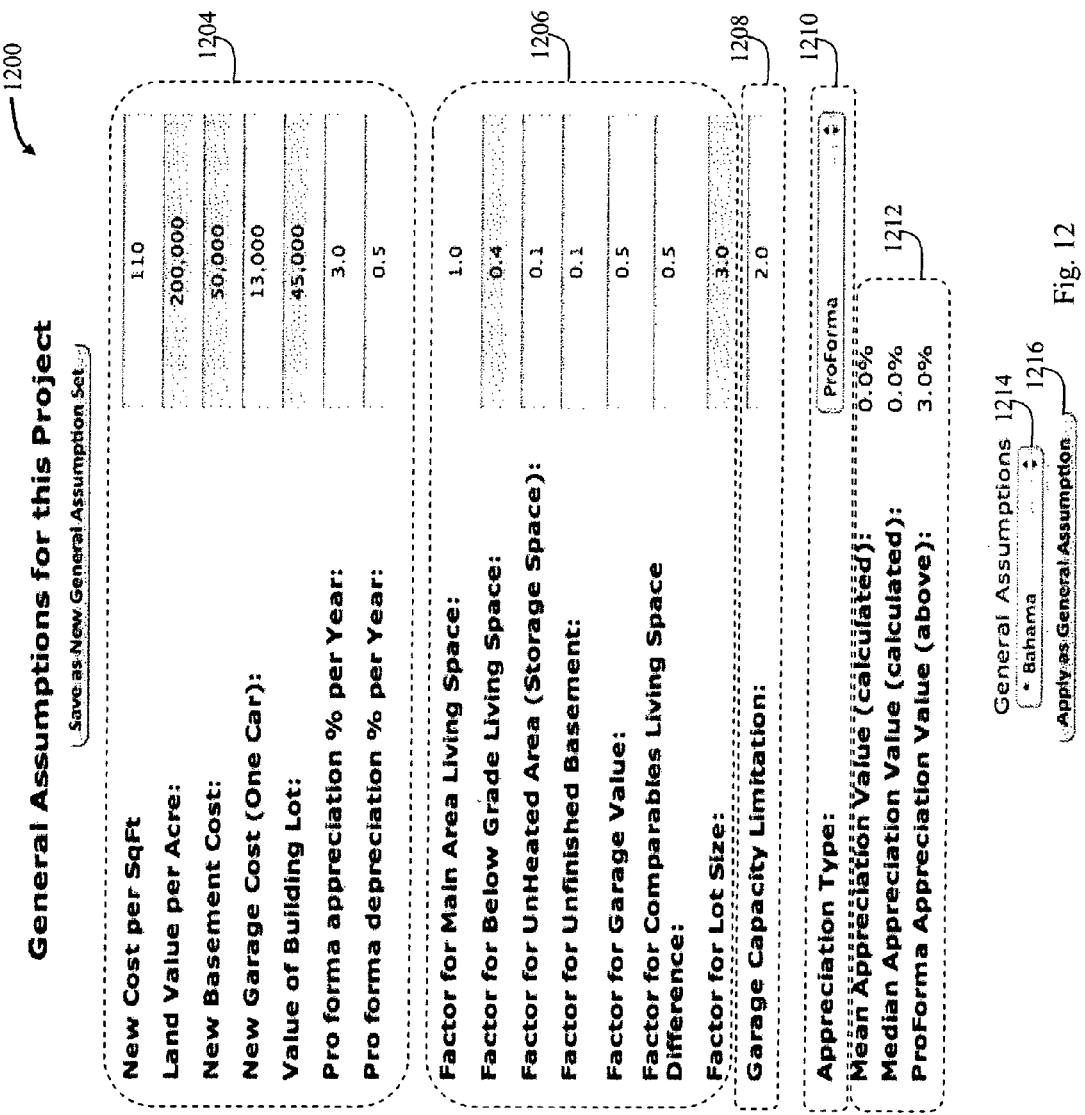
FIG. 12 illustrates an exemplary general assumptions page for entry and edit of general costs and factors that affect a valuation in accordance with the present invention.

A general assumptions, values, and factors page 622 assigns user modifiable values to basic elements of property valuation, such as, cost of land, construction costs, cost of basement, cost of garage, and the like. The general assumptions, values, and factors page 622 also assigns factors for relative values such as differential size of building lots, overall square footage differences, relative value of storage spaces, and the like. FIG. 12 illustrates an exemplary general assumptions page 1200 as an example of the general assumptions, values, and factors page 622. The general assumptions page 1200 provides for entry and editing of general costs and factors that affect a valuation in accordance with the present invention. The general assumptions page 1200 includes, for example, value assumptions relating to general costs 1204 that are relevant in determining property value. Factors 1206 and garage limitation 1208 are used to facilitate calculations without requiring additional data entry when basic values have been changed. An appreciation type selection box 1210 allows a user to select the most applicable type of appreciation for the calculations. Information group 1212 provides a mean appreciated value and a median appreciation value that are calculated, producing results as presented in FIG. 13B described below. A pro form a appreciation value may be entered by the user. The chosen pro form a appreciation value is applied to presently entered data for the subject property and to the comparables. A general assumption saved value set may be imported by selecting the general assumption action box 1214. The entered general assumptions for this project may be applied for use in the inventive risk reduction analysis through selecting the apply as general assumption action box 1216.

Check values page 624 provides a summary of the calculated values and some analysis reports to give the user a quick look at the results of his choices. CMA charts page 626 provides access to charts, as described in further detail below, that display the various results of CMA calculations.

An edit appreciation page 628 supports the correction or making of changes to data used to calculate the appreciation of properties. FIG. 13A illustrates an exemplary appreciation calculation page 1300 as an example of an appreciation page 628. The appreciation calculation page 1300 provides for use in editing and verifying appreciation calculation and presenting an average annual appreciation rate in accordance with the present invention. The appreciation calculation uniquely identifies properties that have sold more than once and calculates the actual appreciation for those properties. A user may also be involved in selecting properties in any local area that is relevant to the analysis and to the needs of a client. For example, properties included in the risk reduction analysis are briefly listed in information group 1304. Properties which have multiple closing dates are listed in information group 1306. These lists may be edited and entries selected for removal through the use of action buttons 1308, 1310, and 1312 as required by a user. General statistics are shown in information group 1314. The appreciation by year for each selected property used in the appreciation calculation is shown in information group 1316. Also, a statistical average and a median appreciation value are calculated and displayed in information group 1318.

Figure 13B:
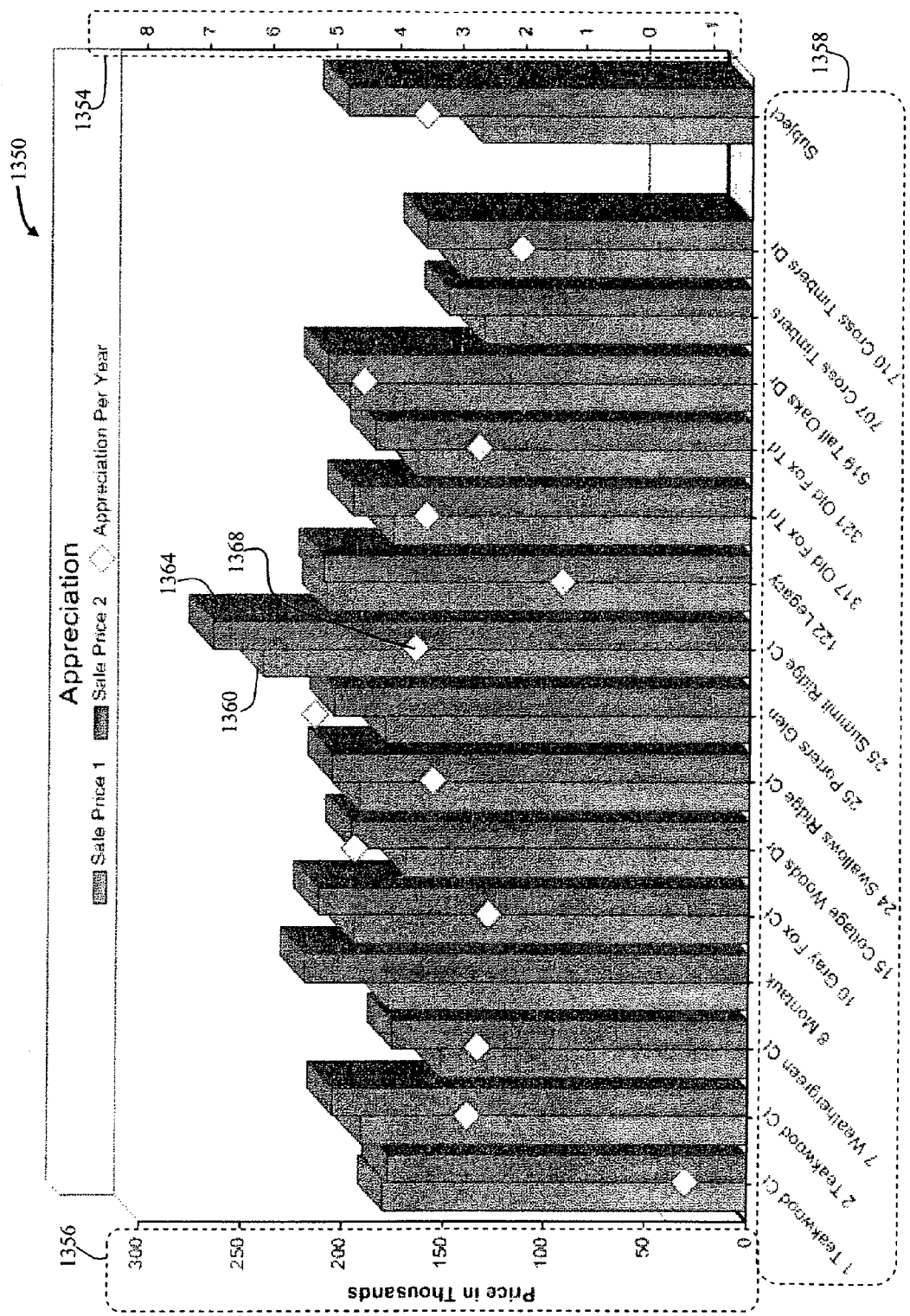
FIG. 13B illustrates an exemplary bar chart graph of the appreciation results for the analyzed properties in accordance with the present invention.

An appreciation chart page 630 displays the results of the appreciation calculations. FIG. 13B illustrates an exemplary bar chart 1350 as an example of the appreciation chart 630. The bar chart 1350 provides appreciation results for a sample of the analyzed properties in accordance with the present invention. The bar chart 1350 shows appreciation percentages on scale 1354, property sales price in thousands on scale 1356, selected properties on the horizontal axis 1358. For example, a property at 25 Summit Ridge Ct. had a first sales price 1360, a second sales price 1364, and a calculated appreciation rate 1368.

Returning to FIG. 6A, an edit market information page 632 supports the correction or making of changes to market data used in various risk reduction calculations. A market information chart page 634 displays general market information from analysis of basic data, such as, the number of properties sold, average sales price, average time to sell, average price differences between asking price and actual price as sold, and the like.

Figure 14A:
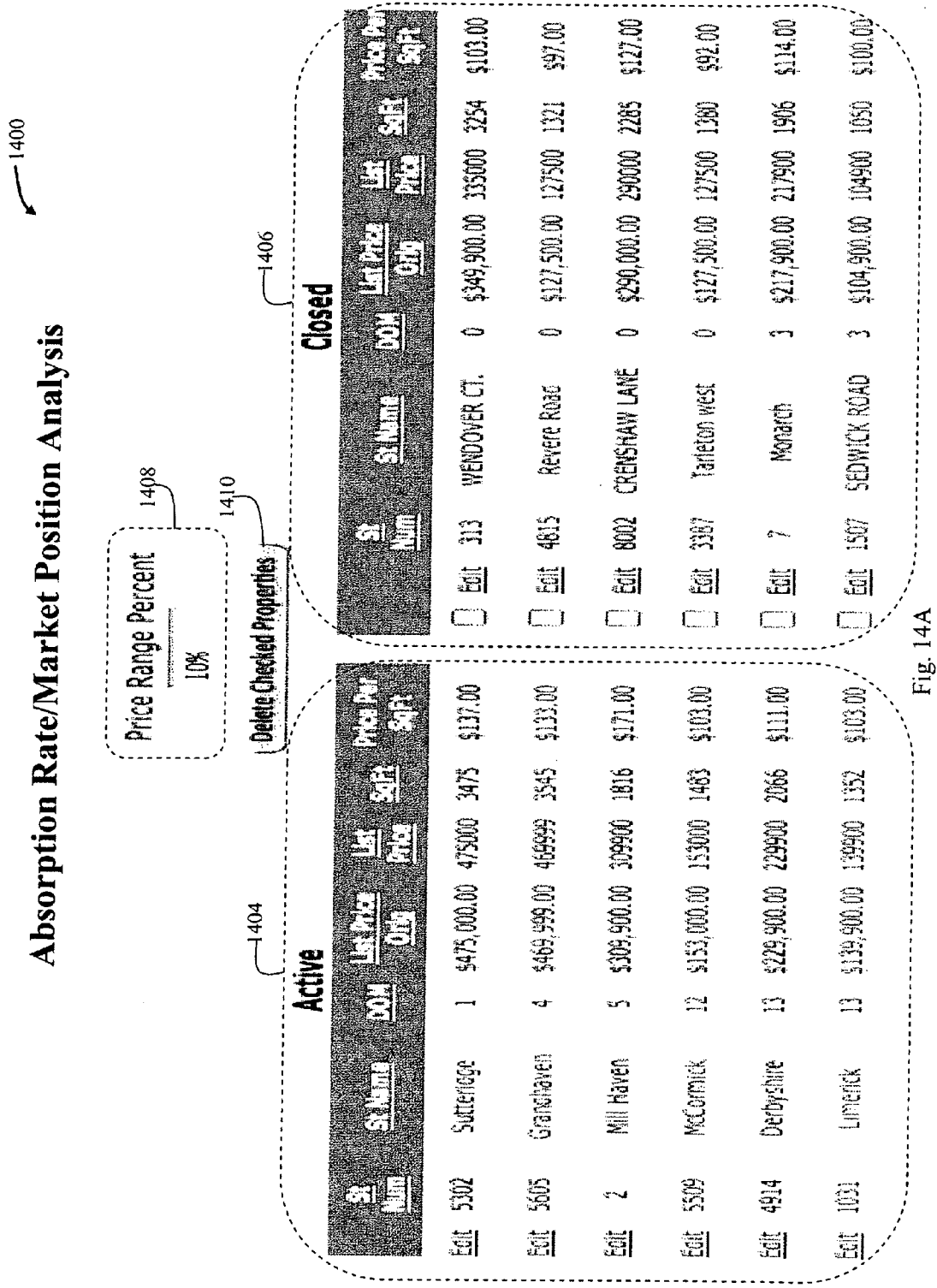
FIG. 14A illustrates an exemplary absorption rate and market position analysis page which presents active and closed properties to evaluate market inventory in accordance with the present invention.

In FIG. 6A, an edit absorption rate page 636 supports the correction or making of changes to data used to calculate absorption of inventory statistics. FIG. 14A illustrates an exemplary absorption rate analysis page 1400 as an example of the edit absorption rate page 636. The absorption rate analysis page 1400 presents active properties 1404 that are currently on the market, closed properties 1406 that have sold in the area in the last twelve months, for example, and a user modifiable price range value 1408 that are used to evaluate market inventory in accordance with the present invention. An absorption rate analysis determines the extent of competitive inventory that is on the market that may affect the price of a subject home. The absorption rate and market position analysis page 1400 may also display relative prices of properties by size or other important aspect of valuation.

Figure 14B:
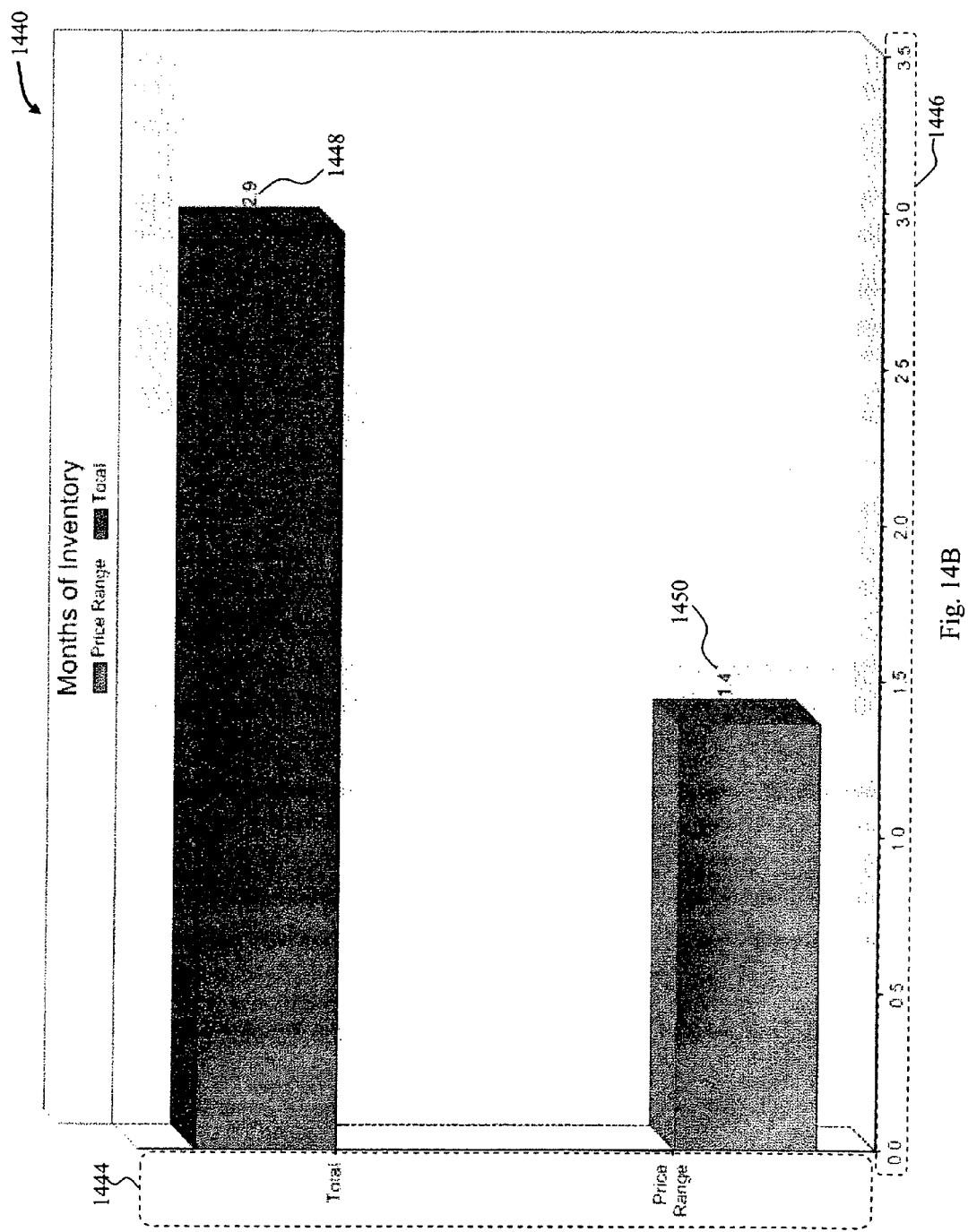
FIG. 14B illustrates an absorption rate bar chart in accordance with the present invention.

FIG. 14B illustrates an absorption rate bar chart 1440 in accordance with the present invention. The absorption rate bar chart 1440 shows the number of months of total inventory on the market 1448 and the number of months of inventory for the subject price range 1450.

Figure 14C:
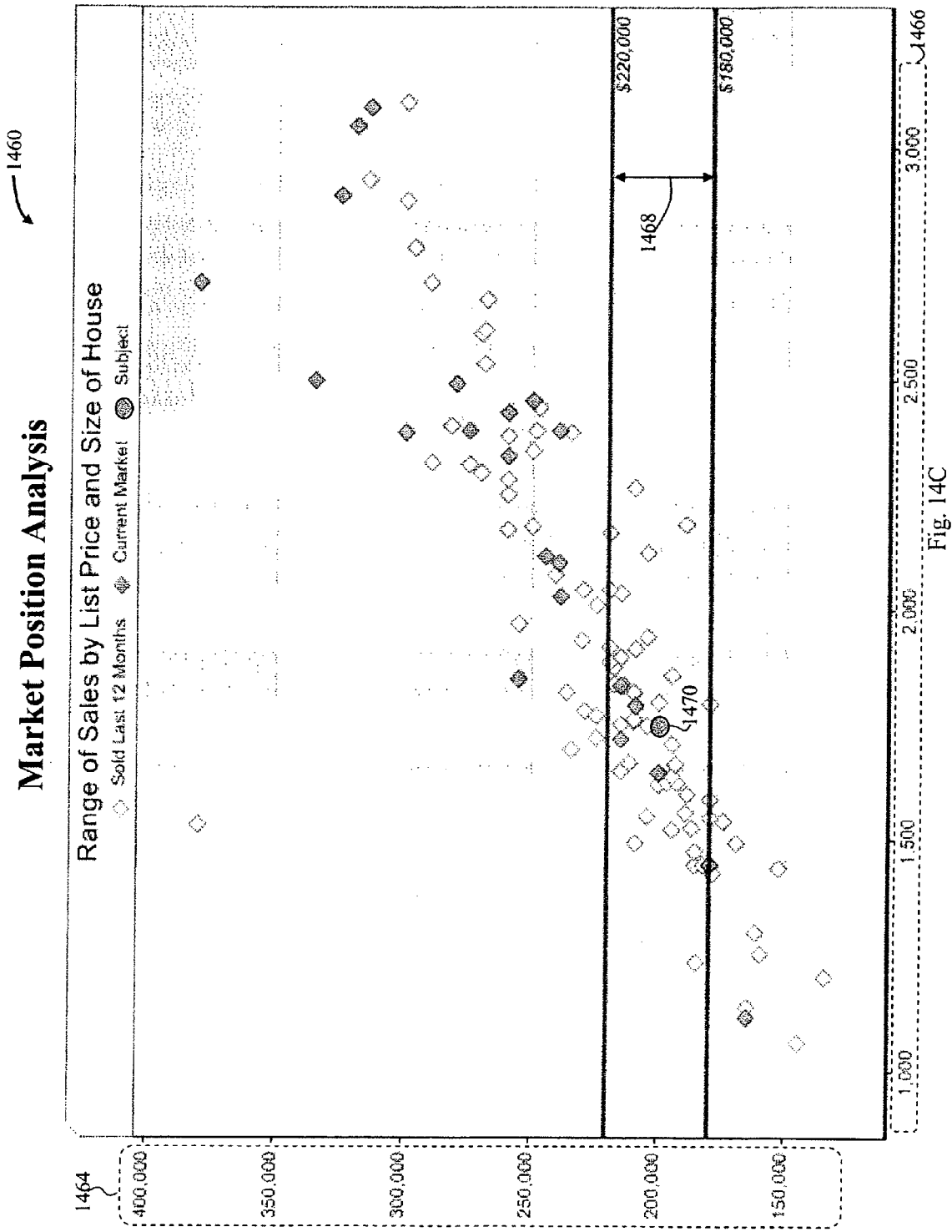
FIG. 14C illustrates an exemplary market position graph in accordance with the present invention.

FIG. 14C illustrates an exemplary market position graph 1460 in accordance with the present invention. The market position graph 1460 shows sales by list price according to scale 1464, size of the house in square footage according to scale 1466, and the selected price range 1468. The subject property 1470 is also shown relative to the other properties.

Figure 14D:
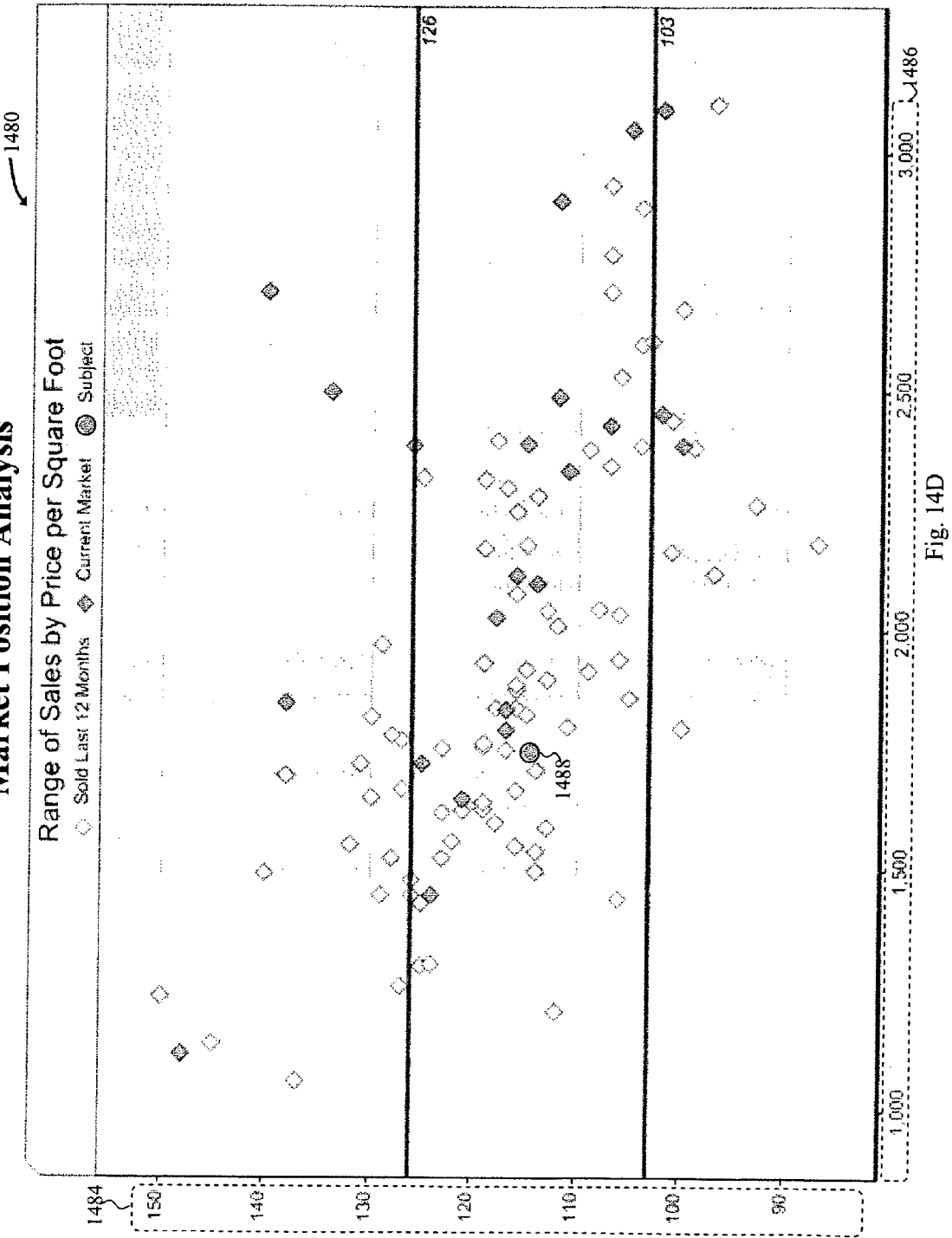
FIG. 14D illustrates an exemplary market position by price per square foot graph in accordance with the present invention.

FIG. 14D illustrates an exemplary market position by price per square foot graph 1480 in accordance with the present invention. The market position by price per square foot graph 1480 shows sales by price per square footage according to scale 1484 and the size of the house in square footage according to scale 1486. The subject property 1488 is also shown relative to the other properties.

Returning to FIG. 6A, an edit risk assessment page 640 supports the correction or making of changes to data used for a risk assessment analysis. The user may also select the date that prices were changed for inclusion in the risk analysis. FIG. 15A illustrates an exemplary risk assessment information page 1500 as an example of the edit risk assessment page 640. The risk assessment information page 1500 provides a user with a number of user modifiable options in accordance with the present invention. The risk assessment information page 1500 includes check select boxes 1504 to identify properties having defective data or more generally properties to be removed by selecting action box 1518. The risk assessment information page 1500 also includes property identification such as by street number and street name in information group 1505, a closed date for the property in information group 1506, days on the market (DOM) 1508, square footage total in information group 1509, original list price (OLP) 1510, list price at time of sale (LP) 1511, selling price (SP) 1512, and a ratio of the LP versus the OLP in information group 1514. The risk assessment information page 1500 may also include a user settable days on the market (DOM) until price change entry box 1516 and an actual DOM to price change 1517.

The risk assessment described herein provides a unique way to quantify the actual penalties for mispricing a property. The risk analysis correlates price changes to days on the market for a large sample of individual properties and calculates relevant averages for price changes, variance of list price from the actual sales price and days on the market. The analysis may provide graphs that display the results of market time penalties resulting from mispricing and that also illustrate reductions in value received based on time on the market. For example, in FIG. 6A, risk assessment charts page 642 and FIGS. 15B-15D present exemplary charts for display of risk assessment analysis.

Figure 15B:
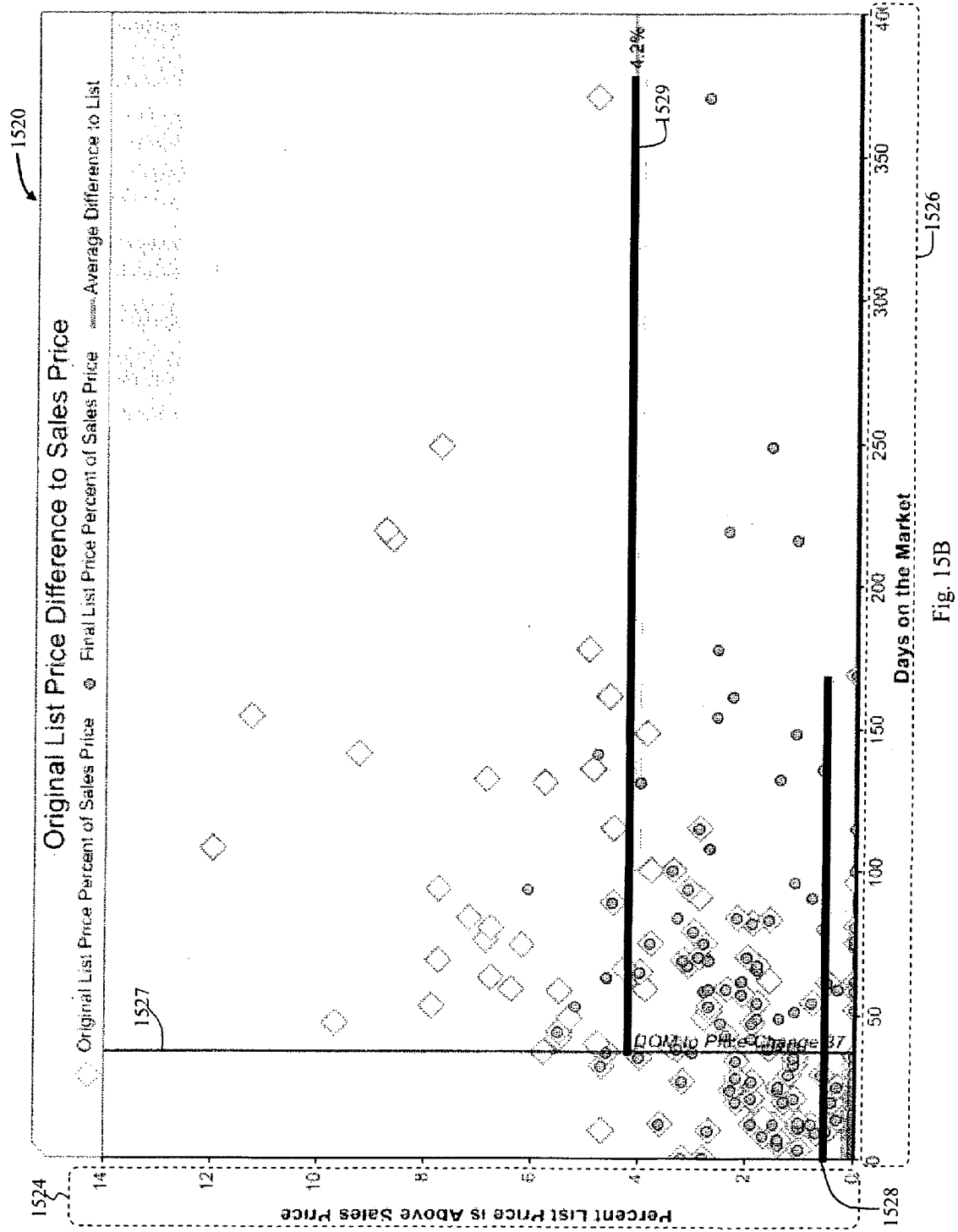
FIG. 15B illustrates an exemplary original list price difference to sales price graph in accordance with the present invention.

FIG. 15B illustrates an exemplary original list price difference to sales price graph 1520 in accordance with the present invention. The graph 1520 plots original list price percent of sales price (◇) and final list price percent of sales price (●) according to a vertical axis 1524 scale of percent list price is above sales price and a horizontal axis 1526 scale of days on the market (DOM). If the original list price and the final list price are the same, the bullet (●) will be centered in the diamond. If the symbols representing the original list price and the final list price are coincident, it is a readily visible indication that there was no change in the original list price. If the symbols are not coincident, which are the diamonds without bullets coincident, then the list price was changed prior to the property being sold. A first indication 1527 represents the number of days prior to the start of a significant number of price changes. Also, in the exemplary graph 1520, the average difference from the original list to sales price was 0.4% for prices that were unchanged, as highlighted by a second indication 1528, as compared to a 4.2% difference for prices that were changed as represented by a third indication 1529. The second indication 1528, in comparison to the third indication 1529 illustrates one aspect of a risky deviation of 4.2% from market price (or from the suggested risk reduction list price based on the analysis) as compared to an acceptable deviation of 0.4%.

Figure 15C:
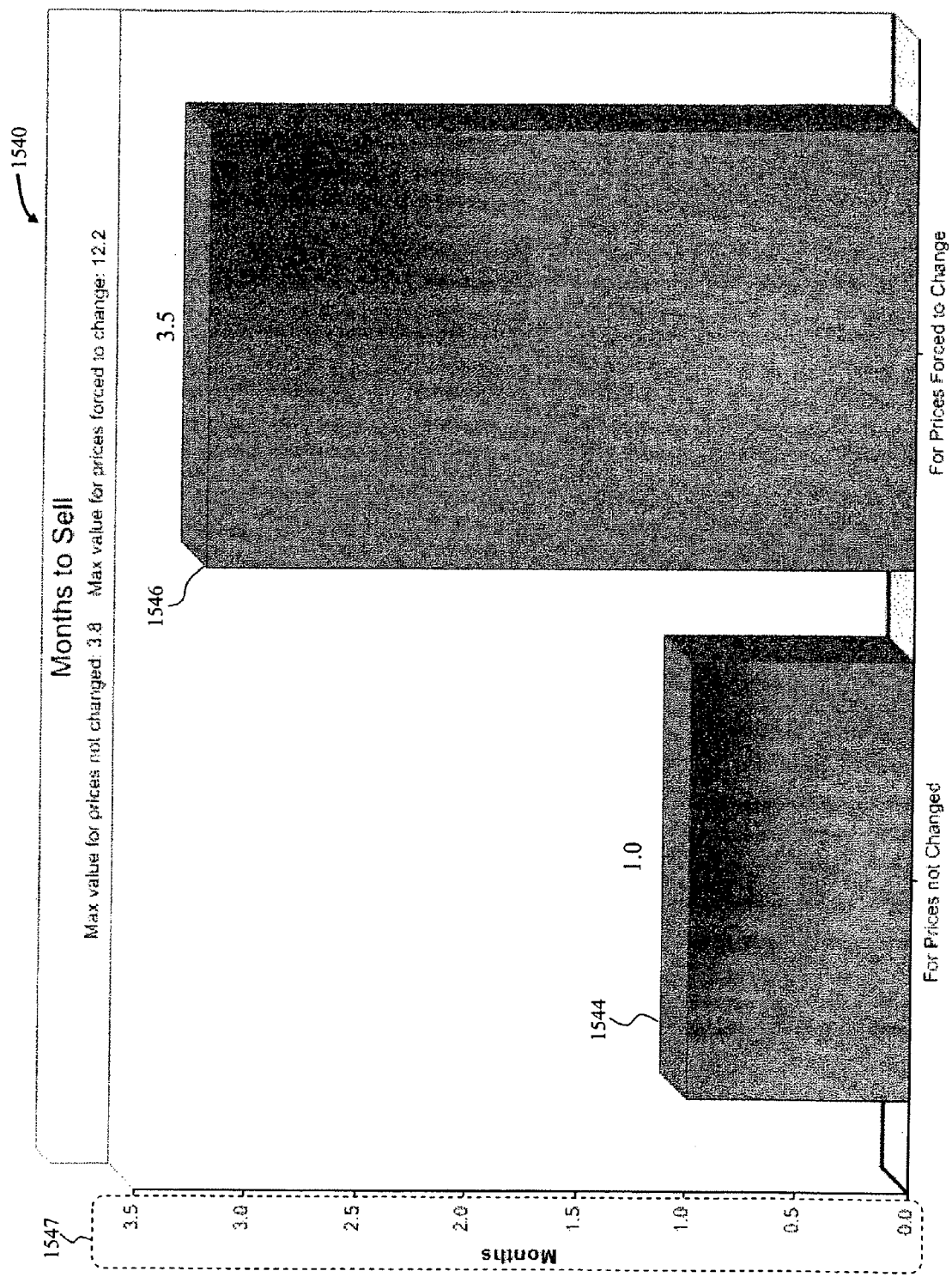
FIG. 15C illustrates an exemplary months to sell bar chart in accordance with the present invention.

FIG. 15C illustrates an exemplary months to sell bar chart 1540 in accordance with the present invention. The bar chart 1540 plots for properties whose listing price was not changed, a first average time on the market 1544 and for properties whose listing price was changed, a second average time on the market 1546 according to a vertical axis 1547 scale of months to sell. The bar chart 1540 illustrates that properties which did not change their original list price have a first average 1544 of 1.0 month on the market. The properties that have changed price, generally due to being priced too high, have a second average 1546 of 3.5 months on the market. For the exemplary market data used to create the bar chart 1540, the maximum number of months on the market for properties whose original listing price has not changed was 3.8 months, while for properties where the original listing prices were changed, the maximum number of months on the market was 12.2 months. The difference between the first average 1544 and the second average 1546 represents a risk of incorrectly pricing a property.

Figure 15D:
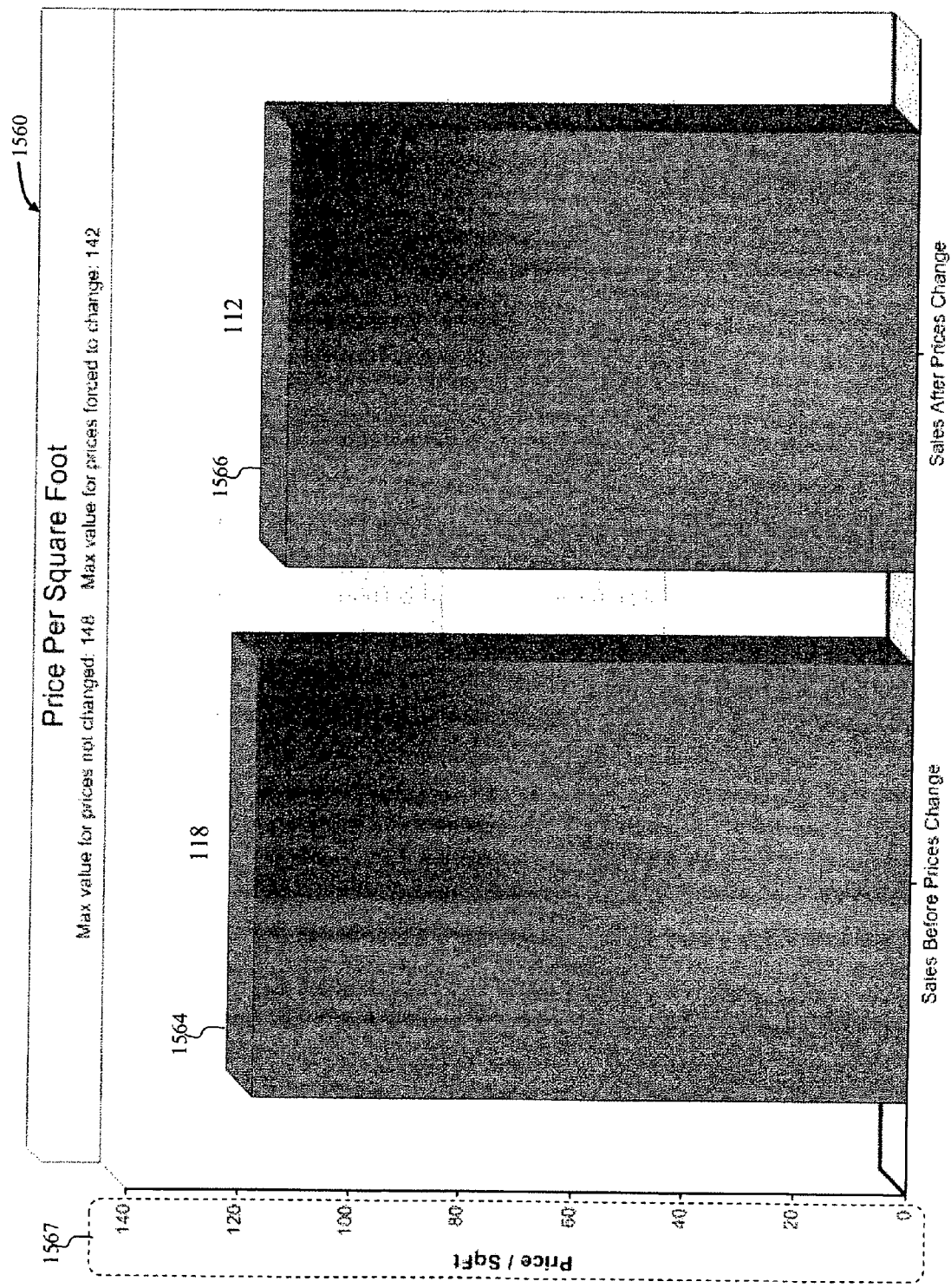
FIG. 15D illustrates an exemplary list to close price per square foot bar chart in accordance with the present invention.

FIG. 15D illustrates an exemplary list to close price per square foot bar chart 1560 in accordance with the present invention. The bar chart 1560 plots the price per square foot for properties sold before the day that significant price changes started as a first average price/sqft 1564 and the price per square foot for properties after the day that significant price changes started as a second average price/sqft 1566. The first and second average price/sqft 1564 and 1566, respectively, are plotted according to a vertical axis 1567 scale of price per square foot (price/sqft). Both average prices 1564 and 1566 are based on final sales figures. For example, the first price per square foot average 1564 for properties before prices started to change was $118/sqft, while the second price per square foot average 1566 for properties after prices started to change was $112/sqft. Also, the maximum price per square foot for properties before prices started to change was $148/sqft while the maximum price per square foot for properties after prices started to change was $142/sqft. Generally, the difference in average price/sqft quantifies the risk of pricing the property at a point where it will remain on the market and be "forced" to change price. For example, for a home with 1,870 sqft, the difference in value, or value lost due to a reduction in the listing price, can be quantified by the following calculation: ($118/sqft−$112/sqft)*1,870 sqft=$11,220. The $11,220 represents the potential loss or risk resulting from incorrectly pricing the home initially.

Returning to FIG. 6A, a check values page 614 summarizes results in a comprehensive easy to read format that allows a user to quickly ascertain the reasonability of the risk reduction analysis and decide if changes may be required. FIG. 16 illustrates an exemplary risk reduction results summary page 1600 as an example of a check values page 614. The risk reduction results summary page 1600 shows results of property price calculations by multiple methods in accordance with the present invention. For example, six different value calculation methods are shown in information group 1604. These six different value calculation methods include an appreciation method, a replacement method, a price per square foot (sqft) method, a weighted comparables (comps) method, a median comps method, and a weighted average of all factors method. Each method produces a projected value for the property. A trial price may also be entered by a user for comparison purposes, but this is a working estimate only and is not used in calculations.

As a gauge for further evaluating the analysis, a result summary table 1606 shows a range and an average value of each calculation. Another table of calculated comparable adjustments is shown in comparable summary table 1608. For example, a percent total adjustments column 1609 facilitates determination of accuracy of a comparable entry. Entry boxes 1610 are provided for selecting whether to include special features in replacement value and whether to include splitable lots in square foot calculations. Also, links to general assumptions, values, and factors page 622 and feature values and factors page 620 are provided in action boxes 1612 allowing a user to change assumptions and/or sets of assumptions to quickly evaluate the effect of such changes on the results.

Figure 6B:
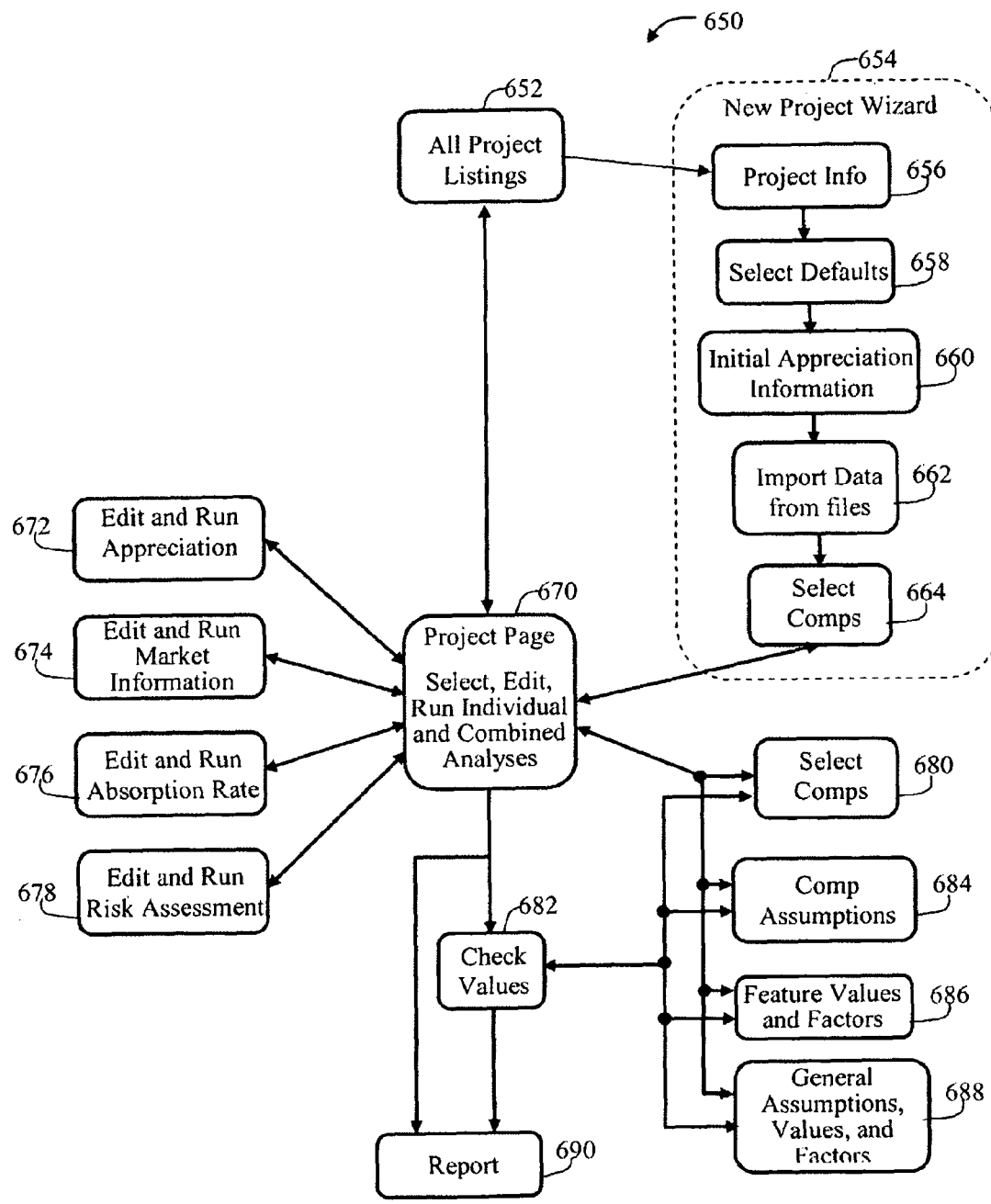
FIG. 6B illustrates a process for risk reduction analysis.

FIG. 6B illustrates a process 650 for risk reduction analysis in accordance with the present invention. The process begins at step 652 with access to a project listing page, such as the all projects listing page 606, and invokes a new project wizard 654. The new project wizard 654 provides a sequence of steps that lead a user through an initial data entry process to simplify the overall risk reduction analysis procedure and reduce the possibility of errors. For example, at step 656, project information is entered, such as whether the user is a seller's agent or a buyer's agent, user name, address, and initial estimated trial price. At step 658, the user selects default value sets for general assumptions and feature values. At step 660, previous sales data on the subject property is entered as initial appreciation information and the user is offered the option of calculating a new subject price based on appreciation. At step 662, data, associated with the subject property, is selected by the user to be imported into the risk reduction analysis. For example, at step 662, a subject property MLS number, a list of comparables, a list of closed properties, a list of active and expired, properties may be selected and entered. At step 664, a user advances to a select comparables page, such as select comps page 614 of FIG. 6A, and begins the process to select comparables for the risk reduction analysis. The new project wizard 654 then returns the user to step 670, which is associated with a project page, such as project page 610 of FIG. 6A.

At step 670, the user may select step 672 associated with, for example, the edit appreciation page 628, step 674 associated with, for example, the edit market information page 632, step 676 associated with, for example, the edit absorption rate page 636, or step 678 associated with, for example, the edit risk assessment page 640. The information associated with steps 672, 674, 676, and 678 may be individually edited and the corresponding analysis run as selected by the user. The user may also decide to revisit the select comparables page 614 at step 680 to add or delete comparables. The process 650 then proceeds to step 682 associated with, for example, the check values page 624 or step 690 to generate a report. At step 682, the user may select step 680 to revisit the select comparables page 614 to add or delete comparables. At step 682, the user may also select step 684 associated with, for example comparable assumptions page 618, step 686 associated with, for example, feature values and factors page 620, or step 688 associated with, for example, general assumptions, values, and factors page 622 to update the corresponding values and assumptions.

While the present invention has been disclosed in a presently preferred context, it will be recognized that the present teachings may be adapted to a variety of contexts consistent with this disclosure and the claims that follow. It will be appreciated that variations in the particular hardware and software employed are feasible, and to be expected as both evolve with time. For example, risk reduction tools are expected to evolve with time and technology developments. New versions of the risk reduction tools may incorporate more statistical analysis and prediction techniques to provide a user with the ability to forecast when a house should sell given a particular price range. Further detailed financial analyses may be provided showing additional options for buyers and sellers. Other such modifications and adaptations to suit a particular design application and content will be readily apparent to those of ordinary skill in the art.

I claim:

1. A method for generating a credible market value that is utilized to produce a listing price for a property with a reduced risk of pricing too high and having to make a reduction in the listing price exceeding a predetermined amount before selling the property, the method comprising:

importing a first set of property data by a processor from one or more databases having a plurality of properties for sale and that have been sold which includes a subject property and selected comparable properties that have been sold in a specified area within a recent time period;

importing a second set of property data by the processor from the one or more databases including the selected comparable properties and additional properties similar to the subject property that have been sold in the specified area within an extended time period greater than the recent time period, wherein the second set of property data includes similar properties that reduced an original listing price to a reduced listing price prior to sale and a first associated sales price, a date the original listing price was reduced, similar properties that did not reduce an original listing price prior to sale and a second associated sales price, and for each property a listing date, a sales date, and a number of days on the market (DOM) for each property that was sold and wherein the second set of property data is larger than the first set of property data;

analyzing by the processor an average difference between the original listing price and the first associated sales price at a price change start date when two or more of the similar properties that reduced an original listing price prior to sale sold at a reduced sales price, compared to an average difference between the original listing price and the second associated sales price for each of the similar properties that did not reduce the original listing price to determine consequences of originally pricing a property too high and a list-to-sale-price percentage of a listing price based on the average difference between the original listing price and the second associated sales price for the similar properties that did not reduce an original listing price prior to sale, wherein the consequences include an extension on the DOM and a financial penalty;

running a market analysis process on the second set of property data by the processor to produce relative market assessments;

running residential value processes including appreciation calculations by the processor based on similar properties having multiple sales to produce a credible market value for the subject property; and running a price sensitivity analysis process to generate a listing price of the subject property that takes into account the credible market value, the relative market assessments, and the consequences of originally pricing the property too high and thereby reduce the risk of having to make a reduction greater than the list-to-sale-price percentage of the listing price before selling the subject property, avoid an extended DOM, avoid being forced to reduce the listing price of the subject property, and avoid a reduction in return to the seller.

2. The method of claim 1 wherein the appreciation calculations comprise:
calculating a price change between sales for each of the similar properties having multiple sales;
calculating yearly price appreciation for each of the similar properties having multiple sales; and
calculating the mean and median appreciation value for the similar properties having multiple sales, as representing the mean and median values of appreciation for the second set of property data.

3. The method of claim 1 further comprising:
correlating by the processor days on the market to a start of price reductions for each property of the similar properties that reduced an original listing price prior to sale;
calculating by the processor the differences to actual sales prices for listing prices that were changed and for listing prices that were unchanged; and
calculating by the processor a time on market difference between properties for which prices were changed and those properties whose prices were not changed.

4. The method of claim 3 further comprising:
calculating by the processor a received value difference before and after the price reductions have started; and
calculating by the processor a financial penalty resulting from an extended market time.

5. The method of claim 1 further comprises:
calculating by the processor an adjusted value for each property of the selected comparable properties based on stored factors and values associated with the various features of the selected comparable properties to account for differences between a selected comparable property and the subject property, wherein the adjusted value approximates a value for the subject property and wherein the use of stored factors and values facilitates data entry; and
calculating by the processor an average of the adjusted values for the selected comparable properties to generate a final adjusted value for the selected comparable properties.

6. The method of claim 1 further comprising:
calculating a relative replacement value by the processor for the subject property and each property of the selected comparable properties, based on land values, a construction factor, a feature factor, and a construction value per square foot, wherein the construction value per square foot is based on relevant new home sales figures.

7. The method of claim 6 wherein the step of calculating a relative replacement value comprises:
calculating a percent difference between the relative replacement value and the actual price sold for each of the selected comparable properties;
calculating an average percent difference of the selected comparable properties; and
applying the average percent difference to the replacement value of the subject property to derive an estimated selling price for the subject property.

8. The method of claim 7 further comprising:
weighting the comparable properties to adjust the average percent difference before applying the average percent difference to the replacement value of the subject property.

9. The method of claim 1 further comprising:
calculating by the processor an adjusted square footage value for each of the selected comparable properties based on factors associated with features of the comparable property.

10. The method of claim 9 further comprising:
calculating by the processor an average adjusted square footage value for the selected comparable properties; and
applying by the processor the average square footage value to the subject property to derive an estimated selling price for the subject property.

11. The method of claim 1 further comprising:
calculating by the processor an average adjusted value for each of the selected comparable properties based on factors associated with features of the comparable properties to account for differences between a selected comparable property and the subject property and to derive a final adjusted value for each of the selected comparable properties;
calculating by the processor yearly price appreciation value for each of the similar properties having multiple sales;
calculating by the processor a relative replacement value for the subject property and each property of the selected comparable properties to derive a first estimated selling price for the subject property based on the relative replacement value;
calculating by the processor an average adjusted square footage value for each of the selected comparable properties based on associated factors to derive a second estimated selling price for the subject property based on the adjusted square footage of the selected comparable properties; and
deriving by the processor the credible market value based on a combination of one or more values selected from the final adjusted value for each of the selected comparable properties, the yearly price appreciation value, the first estimated selling price, and the second estimated selling price.

12. The method of claim 11 wherein the factors include one or more selected factors representing a value of main area square footage, a value of below grade square footage, a value of unheated space, a value of storage space, a value of lot size, a value of splitable lots, a value of one or more upgrades to a property, a value of construction materials used in the construction of the property, a value of one or more capital improvements, a value of the land, a value of a swimming pool or hot tub, value of a seller defined feature, and a value of detached housing or storage space located on the property.

13. The method of claim 1 further comprising:
preparing sales information by the processor for the properties that have been sold from which a DOM to price change start is selected when two or more of the similar properties that reduced the original listing price prior to sale sold at reduced sales prices; and
performing a price sensitivity analysis by the processor for properties in the second set of property data based on a difference between a properties original listing price and the properties sales price for the properties that did not change the original listing price and for the similar properties that reduced the original listing price prior to sale to produce a financial consequences of originally pricing a property too high.

14. A computer-readable medium storing a non-transitory computer program which causes a computer system to perform a method for generating a credible market value that is utilized to produce a listing price for a property with a reduced risk of pricing too high and having to make a reduction in the listing price exceeding a predetermined amount before selling the property, the method comprising:

importing a first set of property data from one or more databases having a plurality of properties for sale and that have been sold which includes a subject property and selected comparable properties that have been sold in a specified area within a recent time period;

importing a second set of property data from the one or more databases including the selected comparable properties and additional properties similar to the subject property that have been sold in the specified area within an extended time period greater than the recent time period, wherein the second set of property data includes similar properties that reduced an original listing price to a reduced listing price prior to sale and a first associated sales price, a date the original listing price was reduced, similar properties that did not reduce the original listing price prior to sale and a second associated sales price, and for each property a listing date, a sales date, and a number of days on the market (DOM) for each property that was sold and wherein the second set of property data is larger than the first set of property data;

analyzing an average difference between the original listing price and the first associated sales price at a price change start date when two or more of the similar properties that reduced an original listing price prior to sale sold at a reduced sales price, compared to an average difference between the original listing price and the second associated sales price for each of the similar properties that did not reduce the original listing price to determine consequences of originally pricing a property too high and a list-to-sale-price percentage of a listing price based on the average difference between the original listing price and the second associated sales price for the similar properties that did not reduce an original listing price prior to sale, wherein the consequences include an extension on the DOM and a financial penalty;

running a market analysis process on the second set of property data to produce relative market assessments;

running residential value processes including appreciation calculations based on similar properties having multiple sales to produce a credible market value for the subject property; and running a price sensitivity analysis process to generate a listing price of the subject property that takes into account the credible market value, the relative market assessments, and the consequences of originally pricing the property too high and thereby reduce the risk of having to make a reduction greater than the list-to-sale-price percentage of the listing price before selling the subject property, avoid an extended DOM, avoid being forced to reduce the listing price of the subject property, and avoid a reduction in return to the seller.

15. The computer-readable medium of claim 14 further comprising:

calculating a received value difference before and after the price reductions have started; and calculating a financial penalty that results from extended market time.

16. The computer-readable medium of claim 14 further comprising:

calculating an average adjusted value for each of the selected comparable properties based on factors associated with features of the comparable properties to account for differences between a selected comparable property and the subject property and to derive a final adjusted value for each of the selected comparable properties;

calculating yearly price appreciation value for each of the similar properties having multiple sales;

calculating a relative replacement value for the subject property and each property of the selected comparable properties to derive a first estimated selling price for the subject property based on the relative replacement value;

calculating an average adjusted square footage value for each of the selected comparable properties based on associated factors to derive a second estimated selling price for the subject property based on the adjusted square footage of the selected comparable properties; and deriving a recommended listing price based on a combination of one or more values selected from the final adjusted value for each of the selected comparable properties, the yearly price appreciation value, the first estimated selling price, and the second estimated selling price.

17. The computer-readable medium of claim 14 further comprising:

preparing sales information for the properties that have been sold from which a DOM to price change start is selected when two or more of the similar properties that reduced the original listing price prior to sale sold at reduced sales prices; and performing a price sensitivity analysis for properties in the second set of property data based on a difference between a properties original listing price and the properties sales price for the properties that did not change the original listing price and for the similar properties that reduced the original listing price prior to sale to produce a financial consequence of originally pricing a property too high.

18. A method for generating a listing price for a property with an increased probability of selling the property and a reduced risk of having to lower the listing price before selling the property, the method comprising:

analyzing a selected set of properties by a processor that have been sold within a recent time period in a specified area and that are comparable to a subject property to determine a credible market value for the subject property, wherein the specified area includes the subject property;

analyzing a historical set of properties by the processor including the selected comparable properties and additional properties similar to the subject property that have been sold in the specified area within an extended time period greater than the recent time period, wherein the historical set of properties includes similar properties that reduced an original listing price to a reduced listing price prior to sale, a date the original listing price was reduced, similar properties that did not reduce the original listing price, and for each property a listing date, a sales price, and a sales date to determine days on the market (DOM) to a price change start date when two or more of the similar properties that reduced the original listing price sold at reduced sales prices and wherein the historical set of properties is larger than the selected set of comparable properties; and performing a price sensitivity analysis by the processor for properties in the historical set of properties to produce a first empirical limit based on an average difference between an original listing price and the sales price for the similar properties that did not change the original listing price, to produce a second empirical limit based on an average difference between an original listing price and the sales price for the similar properties that reduced the original listing price, and to produce a financial consequence of originally pricing a property too high that shows average sales prices for the similar properties that were originally priced too high and reduced the original listing price were at values below average sales prices before the price change start date for the similar properties that did not change the original listing price, wherein a listing price of the subject property is generated based on the credible market value, the empirical limits, and the financial consequences of originally pricing the subject property too high to thereby increase the probability of a sale and reduce the risk associated with pricing the subject property too high which would have the effect of both an increased DOM to a sale and a reduced monetary return for the subject property.

19. The method of claim 18 further comprising:

running by the processor a market analysis process on the processor to produce relative market assessments, including an inventory analysis of similar properties sold in the past year compared to similar properties currently on the market to determine whether the market favors buyers or sellers; and running by the processor a residential value process including appreciation calculations on the processor based on the similar properties having multiple sales to produce a credible market value for the subject property, wherein the listing price takes into account the credible market value and the relative market assessments.

20. The method of claim 18 further comprising:

calculating by the processor, for similar properties sold in the period before the price change start, a first average price per square foot and for the similar properties sold after the price change start, a second average price per square foot; and calculating by the processor a difference between the first average price per square foot and the second average price per square foot as a value lost that is multiplied by the number of square feet in the subject property to represent a financial risk included in the financial consequences of originally pricing the property too high.

21. The method of claim 18 further comprising:

running residential value processes including calculating a preliminary listing price for the subject property based on individual weighting of relative replacement values for each of the selected comparable properties;

running a market position analysis process by the processor that includes a comparison of the preliminary listing price of the subject property relative to properties in the second set of property data which have sold in the last twelve months and properties in the second set of property data that are currently active on the market as competitive properties; and deriving by the processor the listing price of the subject property based on the market position analysis.

* * * * *